(12) United States Patent
Ohsumi et al.

(10) Patent No.: US 10,163,237 B2
(45) Date of Patent: Dec. 25, 2018

(54) INFORMATION DISPLAY SYSTEM AND NON-TRANSITORY COMPUTER-READABLE RECORDING MEDIUM

(71) Applicant: CASIO COMPUTER CO., LTD., Tokyo (JP)

(72) Inventors: Tsuyoshi Ohsumi, Tokyo (JP); Keita Anjo, Tokyo (JP); Koji Nishitani, Tokyo (JP); Noriyoshi Katsumura, Saitama (JP); Taro Ejiri, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/649,855

(22) Filed: Jul. 14, 2017

(65) Prior Publication Data

US 2018/0040148 A1 Feb. 8, 2018

(30) Foreign Application Priority Data

Aug. 5, 2016 (JP) .................. 2016-154880
Dec. 15, 2016 (JP) .................. 2016-243715

(51) Int. Cl.
| | | |
|---|---|---|
| *G06F 3/0481* | (2013.01) | |
| *G06F 3/0482* | (2013.01) | |
| *G06T 11/20* | (2006.01) | |
| *G06F 3/0484* | (2013.01) | |
| *G06Q 10/06* | (2012.01) | |

(52) U.S. Cl.
CPC .......... *G06T 11/206* (2013.01); *G06F 3/0481* (2013.01); *G06F 3/0482* (2013.01); *G06F 3/04812* (2013.01); *G06F 3/04847* (2013.01); *G06Q 10/063* (2013.01)

(58) Field of Classification Search
None
See application file for complete search history.

(56) References Cited

U.S. PATENT DOCUMENTS

| | | | | |
|---|---|---|---|---|
| 2015/0356064 | A1* | 12/2015 | Mizuno | G06F 17/30994 715/780 |
| 2016/0019568 | A1* | 1/2016 | Batrakov | G06Q 30/0202 705/7.31 |
| 2016/0309096 | A1* | 10/2016 | Hagisu | G06K 9/00342 |

FOREIGN PATENT DOCUMENTS

| | | |
|---|---|---|
| JP | H11-259564 A | 9/1999 |
| JP | 2001-216372 A | 8/2001 |
| JP | 2011-65340 A | 3/2011 |

\* cited by examiner

*Primary Examiner* — Kee M Tung
*Assistant Examiner* — Yanna Wu
(74) *Attorney, Agent, or Firm* — Fitch, Even, Tabin & Flannery LLP

(57) ABSTRACT

An information display system according to the present invention includes: a graph display control unit configured to display a comparison graph in which a current transition graph representing a current period of time-series information and a previous transition graph representing a previous period of the time-series information are arranged such that time-axis components of the current period and time-axis components of the previous period which corresponds to one period before the time-axis components of the current period are placed in identical positions, in which the graph display control unit displays the previous transition graph including a portion corresponding to a future in the current period.

17 Claims, 17 Drawing Sheets

FIG. 3

| DATE | SALES | NUMBER OF CUSTOMERS | SALES PER CUSTOMER | PURCHASES | COST RATE | GROSS PROFIT | GROSS PROFIT MARGIN | EXPENSES | LABOR COSTS | FL RATE | IMPORTANCE LEVEL | LIKE | COMPLAINT | WEATHER | COMMENT |
|---|---|---|---|---|---|---|---|---|---|---|---|---|---|---|---|
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| 6/26/2016 | ⋮ | 86 | ¥3,508 | ¥112,500 | 37% | ⋮ | 63% | ¥10,000 | ¥114,560 | 75% | 2 | 1 | | | |
| 6/27/2016 | ⋮ | 64 | ¥3,508 | ¥78,100 | 35% | ⋮ | 65% | ¥10,000 | ¥76,500 | 69% | 3 | | 1 | RAIN | IT RAINED TODAY. NOT MANY CUSTOMERS VISITED. |
| 6/28/2016 | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |

FIG. 5

DAILY REPORT

61 — DATE: (SUN) JUNE 5, 2016
62 — IMPORTANCE LEVEL: ★★★
63 — WEATHER: ☂

65 —

| TODAY'S SALES PERFORMANCE | | | | | | |
|---|---|---|---|---|---|---|
| SALES | NUMBER OF CUSTOMERS | SALES PER CUSTOMER | PURCHASES | EXPENSES | LABOR COSTS | FL RATE |
| 100,000 | 78 | 1,282 | 30,120 | 2,785 | 28,000 | 60.91% |

66 —

| COMMENT | TERRIBLE WEATHER. LOW TEMPERATURE, COLD, AND RAINY. |
|---|---|

FIG. 6

WORK RECORD TOTAL

| MEAL | 3 | LABOR COSTS | 5,000 | DUTY HOURS | 200 | ESTIMATED WAGES | 111,000 |
|------|---|-------------|-------|------------|-----|-----------------|---------|

WORK RECORD

| REGISTRATION | EMPLOYEE NUMBER | NAME | START TIME | FINISH TIME | BREAK | MEAL | DUTY HOURS | LABOR COSTS | ESTIMATED WAGES | |
|--------------|-----------------|------|------------|-------------|-------|------|------------|-------------|-----------------|---|
| ✓ | 0001 | TARO YAMADA | 08:53 | 13:30 | 0.75 | | 4.75 | 4,750 | 50,000 | ✎ |
|   | 0002 | GORO SATO | 12:55 | 17:35 | 1.25 | 2 | 4.25 | 4,000 | 47,000 | ✎ |
|   | 0003 | HACHIRO KATO | 16:50 | 22:20 | 1.0 | 1 | 5.5 | 5,250 | 64,200 | ✎ |

STORE PERFORMANCE

| SALES | 300,000 | LABOR COSTS | 15,000 |
|-------|---------|-------------|--------|
| NUMBER OF CUSTOMERS | 200 | PURCHASES | 32,000 |
| SALES PER CUSTOMER | 1,500 | EXPENSES | 12,000 |
| | | FL RATE | 15.7 |

TO TRANSACTION ENTRY

TODAY'S EVENT

★★★ IMPORTANCE ☑ LIKE ☑ COMPLAINT ☑ RAIN

IMAGE (UP TO FIVE IMAGES)

SAVE

FIG. 7

DAILY REPORT

- 61 — DATE: (SUN) JUNE 5, 2016
- 62 — IMPORTANCE LEVEL: ★★★
- 63 — WEATHER: ☂

64 —

| TODAY'S WORK RECORD | | | | | | | | |
|---|---|---|---|---|---|---|---|---|
| EMPLOYEE | | START TIME | FINISH TIME | BREAK | MEAL | DUTY HOURS | LABOR COSTS | ESTIMATED WAGES |
| NUMBER | NAME | | | | | | | |
| 1 | ICHIRO YAMADA | 10:00 | 20:00 | 1:30 |  | 8.5 | 10,000 | 212,50 |
| 2 | JIRO SUZUKI | 16:00 | 23:00 | 1:30 | 2 | 6.5 | 10,000 | 155,00 |
| 3 | SABURO SATO | 17:00 | 23:00 | 1:00 | 1 | 6.0 | 8,000 | 135,50 |
| 4 | ... | ... | ... | ... | ... | ... | ... | ... |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |
| 15 | | | | | | | | |
| TOTAL | | | | | 3 | 21.0 | ¥28,000 | 503,0 |

65 —

| TODAY'S SALES PERFORMANCE | | | | | | |
|---|---|---|---|---|---|---|
| SALES | NUMBER OF CUSTOMERS | SALES PER CUSTOMER | PURCHASES | EXPENSES | LABOR COSTS | FL RATE |
| 100,000 | 78 | 1,282 | 30,120 | 2,785 | 28,000 | 60.91% |

66 —

| COMMENT | TERRIBLE WEATHER. LOW TEMPERATURE, COLD, AND RAINY. |
|---|---|

FIG. 9

| | | | |
|---|---|---|---|
| PERFORMANCE | ANALYSIS | | |

SEARCH RESULT

| | | |
|---|---|---|
| PERIOD | START MAY 1, 2016 📅 TO END MAY 31, 2016 📅 | |
| DAY OF WEEK | ● NOT SPECIFIED<br>○ SPECIFY ☐SUN ☐MON ☐TUE ☐WED ☐THU ☐FRI ☐SAT | |
| SALES | ● NOT SPECIFIED<br>○ SPECIFY [____] YEN TO [____] YEN | |
| NUMBER OF EMPLOYEES | ● NOT SPECIFIED<br>○ SPECIFY [____] EMPLOYEES [OR MORE ▶] | |
| EMPLOYEE | ● NOT SPECIFIED<br>○ SPECIFY [0001 TARO YAMADA ▶] | |
| IMPORTANCE | [NOT SPECIFIED ▶] | |
| LIKE | [NOT SPECIFIED ▶] | |
| COMPLAINT | [NOT SPECIFIED ▶] | |
| WEATHER | [NOT SPECIFIED ▶] | |
| IMAGE | [NOT SPECIFIED ▶] | |
| COMMENT | ● NOT SPECIFIED<br>○ SPECIFY [____] | |

[SEARCH] [CLEAR]   [SEARCH OPTION]

FIG. 10

| SEARCH RESULT | | | | | | | | | |
|---|---|---|---|---|---|---|---|---|---|
| DATE | SALES | NUMBER OF EMPLOYEES | IMPORTANCE | LIKE | COMPLAINT | WEATHER | COMMENT | IMAGE | EDIT |
| (SUN) MAY 1, 2016 | 300,000 | 3 | ☆☆ | | ○ | RAIN | PUT ADS TODAY. | 🗒🗒 | ✎ |
| (MON) MAY 2, 2016 | 0 | 0 | | | | | | | ✎ |
| (TUE) MAY 3, 2016 | 0 | 0 | | | | | | | ✎ |
| (WED) MAY 4, 2016 | 220,000 | 3 | | | ○ | RAIN | THANKS TO RECRUITMENT ADS.. | 🗒 | ✎ |
| (THU) MAY 5, 2016 | 200,000 | 4 | ☆☆☆ | ○ | | | | | ✎ |

<< BACK | 1 | 2 | 3 | 4 | 5 | 6 | 7 | NEXT >>

1 TO 5 RESULTS (OUT OF 31 RESULTS IN TOTAL)

| | PERFORMANCE | ANALYSIS | | | | | |
|---|---|---|---|---|---|---|---|
| STORE SITUATION | | | | | ○ MONTHLY | ● WEEKLY | ○ DAILY |
| | GRAPH | ANALYSIS TARGET | THIS TIME 5/9 TO 5/15 | TARGET | PREVIOUS TIME 5/2 TO 5/8 | PREVIOUS YEAR (2015) 5/9 TO 5/15 | AVERAGE OF OTHER STORES |
| 821 | ⦿ | SALES | 1,885,773 | ● 1,750,000 | ○ 1,477,559 | ○ 1,477,559 | 1,878,581 |
| 822 | ○ | NUMBER OF CUSTOMERS | 482 | ● 500 | ○ 431 | ○ 431 | 486 |
| 823 | ○ | SALES PER CUSTOMER | 3,455 | ● 3,500 | ○ 3,427 | ● 3,466 | 3,610 |
| 824 | ○ | SEAT TURNOVER | 1.82 | ● 1.88 | ○ 1.62 | ● 1.60 | 1.75 |
| 825 | ○ | COSTS | 584,794 | ● 525,000 | ○ 658,032 | ● 503,354 | 502,301 |
| 826 | ○ | LABOR COSTS | 553,726 | ● 525,000 | ● 509,710 | ● 430,110 | 598,987 |
| 827 | ○ | SALES PER MAN HOUR | 3,610 | ● 4,000 | ○ 3,478 | ○ 4,064 | 4,320 |
| 828 | ○ | FL RATE | 88.3 | ● 80.0 | ○ 72.3 | ○ 84.1 | 85.8 |
| 829 | ○ | GROSS PROFIT | 1,080,979 | ● 1,225,000 | ○ 919,527 | ○ 953,230 | 1,176,264 |

FIG. 15

| PERFORMANCE | ANALYSIS |
|---|---|
| 41 | 42 |

STORE SITUATION

82

| | GRAPH | ANALYSIS TARGET | THIS TIME (MON) 5/9 TO (SUN) 5/15 | | TARGET | PREVIOUS TIME (MON) 5/2 TO (SUN) 5/8 | | ○ MONTHLY 811 | PREVIOUS YEAR (2015) (MON) 5/11 TO (SUN) 5/18 | ● WEEKLY 812 | ○ DAILY 813 AVERAGE OF OTHER STORES |
|---|---|---|---|---|---|---|---|---|---|---|---|
| 821 | ◉ | SALES | 1,885,773 | ● | 1,750,000 | 1,477,559 | ○ | ○ | 1,477,559 | ○ | 1,878,581 |
| 822 | ○ | NUMBER OF CUSTOMERS | 482 | ● | 500 | 431 | ○ | ○ | 431 | ○ | 486 |
| 823 | ○ | SALES PER CUSTOMER | 3,455 | ● | 3,500 | 3,427 | ○ | ○ | 3,466 | ○ | 3,610 |
| 824 | ○ | SEAT TURNOVER | 1.82 | ● | 1.88 | 1.62 | ○ | ● | 1.60 | ● | 1.75 |
| 825 | ○ | COSTS | 584,794 | ● | 525,000 | 658,032 | ● | ● | 503,354 | ○ | 502,301 |
| 826 | ○ | LABOR COSTS | 553,726 | ● | 525,000 | 509,710 | ● | ● | 430,110 | ○ | 598,987 |
| 827 | ○ | SALES PER MAN HOUR | 3,610 | ● | 4,000 | 3,478 | ○ | ● | 4,064 | ○ | 4,320 |
| 828 | ○ | FL RATE | 88.3 | ● | 80.0 | 72.3 | ○ | ● | 84.1 | ○ | 85.8 |
| 829 | ○ | GROSS PROFIT | 1,080,979 | ● | 1,225,000 | 919,527 | ○ | ○ | 953,230 | ○ | 1,176,264 |

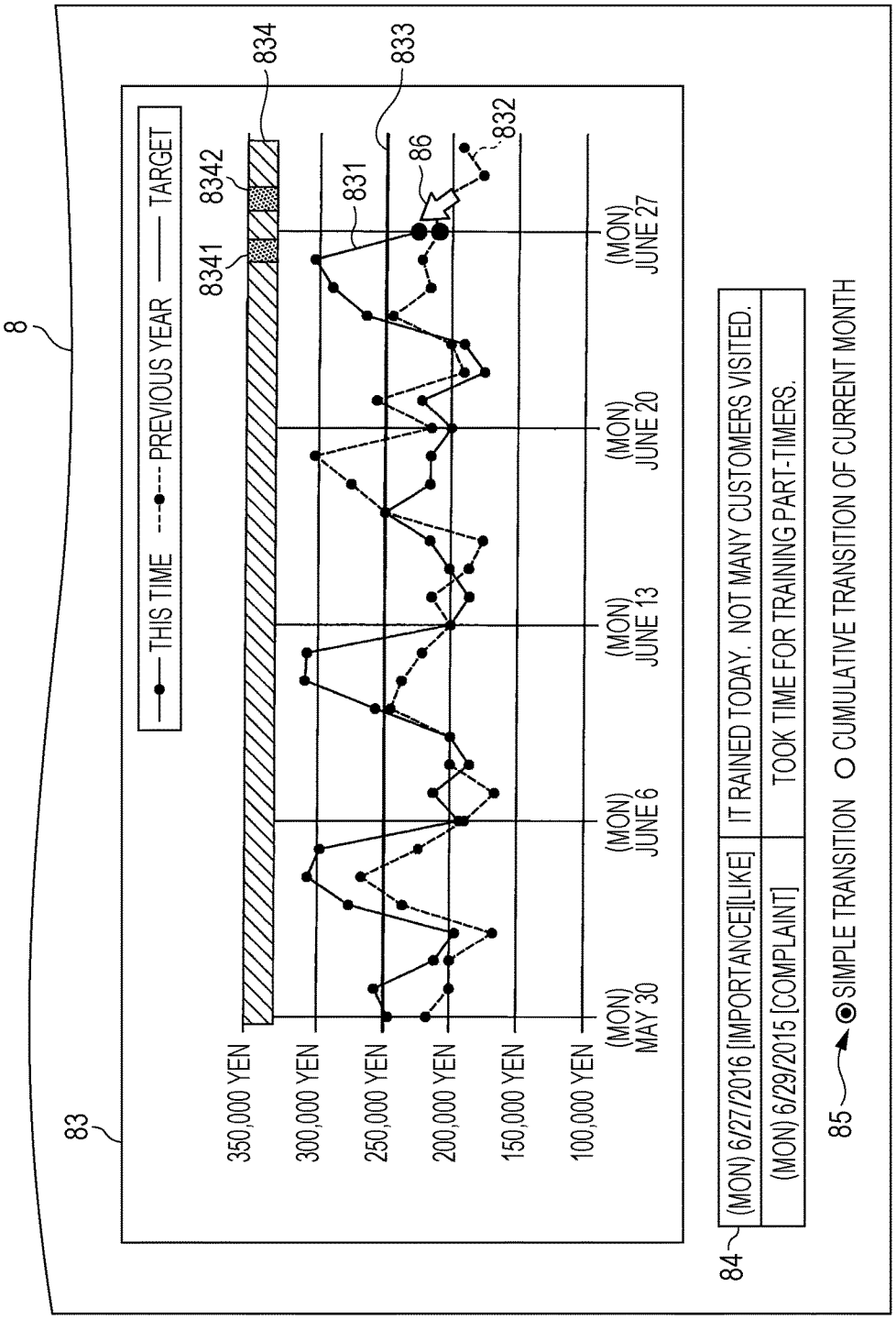

US 10,163,237 B2

INFORMATION DISPLAY SYSTEM AND NON-TRANSITORY COMPUTER-READABLE RECORDING MEDIUM

CROSS-REFERENCE TO RELATED APPLICATIONS

This application is based upon and claims the benefit of priority from the prior Japanese Patent Application No. 2016-154880, filed on Aug. 5, 2016 and the prior Japanese Patent Application No. 2016-243715, filed on Dec. 15, 2016, the entire contents of which are incorporated herein by reference.

BACKGROUND OF THE INVENTION

1. Field of the Invention

The present invention relates to an information display system and a non-transitory computer-readable recording medium.

2. Description of the Related Art

Traditionally, it has been common for private business owners and corporate owners of restaurants and retailers to use sales management devices and business application programs such as sales management programs that aggregate and analyze daily and monthly sales of their stores. Preferable business operations can be achieved by referring to management data visualized in this manner.

As such a sales management device, a technique, for example, to calculate indicator values indicating how sales proceeds, the number of customers, sales per customer, and the like for a specified target date have changed from a comparison date on the basis of management data for the target date and the comparison date and display the indicator values is proposed (JP 2011-065340 A).

SUMMARY OF THE INVENTION

An information display system according to a first aspect of the present invention includes:

a graph display control unit configured to display a comparison graph in which a current transition graph representing a current period of time-series information and a previous transition graph representing a previous period of the time-series information are arranged such that time-axis components of the current period and time-axis components of the previous period which corresponds to one period before the time-axis components of the current period are placed in identical positions, in which the graph display control unit displays the previous transition graph including a portion corresponding to a future in the current period.

An information display system according to a second aspect of the present invention includes:

a graph display control unit configured to display a comparison graph in which a first transition graph representing a focus period of time-series information and a second transition graph representing a contrast period which is one period before the focus period of the time-series information are arranged such that time-axis components of the focus period and time-axis components of the contrast period which corresponds to one period before the time-axis components of the focus period are placed in identical positions, in which the graph display control unit displays the second transition graph including a portion corresponding to a future in the focus period.

A non-transitory computer-readable recording medium according to the present invention is a non-transitory computer-readable recording medium storing a program for causing a computer of an information display system to execute processing, the processing including:

graph display control processing of displaying a comparison graph in which a current transition graph representing a current period of time-series information and a previous transition graph representing a previous period of the time-series information are arranged such that time-axis components of the current period and time-axis components of the previous period which corresponds to one period before the time-axis components of the current period are placed in identical positions, while displaying the previous transition graph including a portion corresponding to a future in the current period.

BRIEF DESCRIPTION OF THE DRAWINGS

FIG. 3 is a view showing a management data table stored in a storage unit;

FIG. 5 is a view showing an example of a daily report for printing for a case where only the accounting service is subscribed;

FIG. 6 is a view showing an example of a daily report screen for a case where accounting and payroll services are subscribed;

FIG. 7 is a view showing an example of a daily report for printing for a case where the accounting and payroll services are subscribed;

FIG. 9 is a view showing a search condition pane on a list display screen of a daily report;

FIG. 10 is a view showing an example of a list display on the list display screen of the daily report;

FIG. 15 is a view showing another example of the management data table on the indicator analysis screen;

FIG. 16 is a diagram showing another example of the indicator analysis graph on the indicator analysis screen;

DETAILED DESCRIPTION OF THE PREFERRED EMBODIMENTS

Hereinafter, an embodiment of the present invention will be described in detail with reference to the respective drawings.

<<Configuration of Management Support System 1>>

Figure 1:
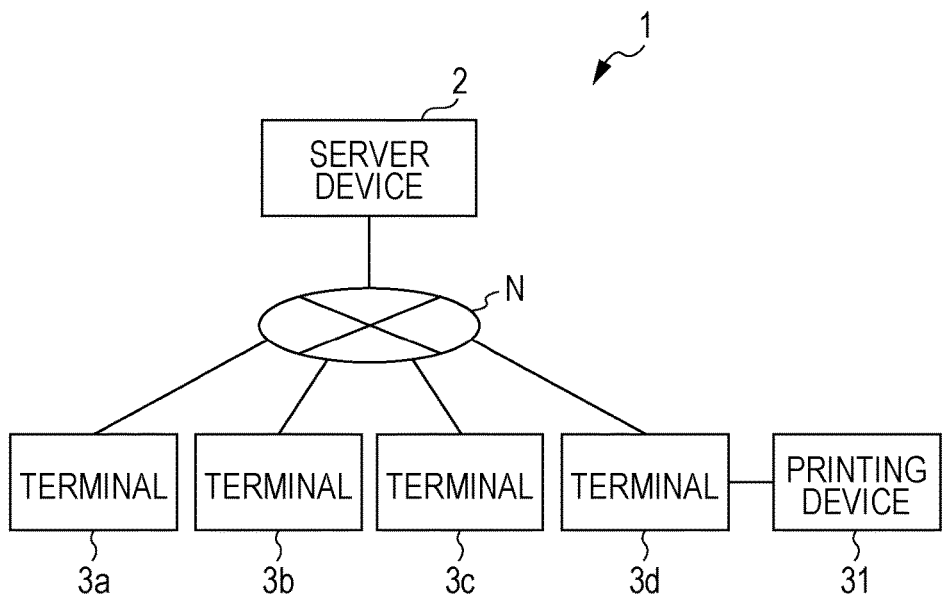
FIG. 1 is a schematic configuration diagram showing a management support system according to the present embodiment.

FIG. 1 is a schematic configuration diagram showing a management support system 1 according to the present embodiment.

The management support system 1 (information display system) according to the present embodiment is a system that facilitates consideration of management on the basis of management data and comment information. This management support system 1 stores management data of a store, a company, or the like run by the user as well as comment information on daily management entered by the user.

This management data is information collected in time series, and similar changes are often repeated with a period of one year.

As shown in FIG. 1, the management support system 1 includes a server device 2 serving as a management support device, a printing device 31, and user terminals 3a to 3d. Each of the devices is connected via a communication network N. The user terminals 3a to 3d are, for example, smartphones, tablet terminals, or personal computers operated by the user. Hereinafter, when the user terminals 3a to 3d are not particularly distinguished from each other, the user terminals 3a to 3d will be simply referred to as a user terminal 3.

The server device 2 collects, aggregates, and records the management data from the user terminal 3. The server device 2 not only manages the recorded management data, but also records and manages the comment information entered by the user terminal 3 in association with a date. Furthermore, the server device 2 distributes daily report screens 5A and 5B (see FIGS. 4 and 6), a list display screen 7 (see FIGS. 9 and 10), an indicator analysis screen 8, or the like to the user terminal 3 in response to a request from the user terminal 3. The daily report screens 5A and 5B are where the user enters the comment information. The indicator analysis screen 8 displays the management data and the comment information.

The user terminal 3 transmits the accumulated management data, entered comment information, and the like to the server device 2. The user terminal 3 receives and displays various kinds of display information transmitted from the server device 2.

The user terminal 3 also accepts operation inputs from the user, and transmits the operation information to the server device 2.

The user terminal 3 may be a dedicated terminal, for example, an electronic register or a point of sales (POS) terminal.

The printing device 31 prints various information on the basis of a print instruction from the user terminal 3.

The communication network N is constituted by the Internet, but may include a local area network (LAN), a wide area network (WAN), and the like, and may include a telephone line, a dedicated line, a mobile communication network, a communication satellite network, a cable television (CATV) line, and the like.

<<Configuration of Server Device 2>>

Figure 2:
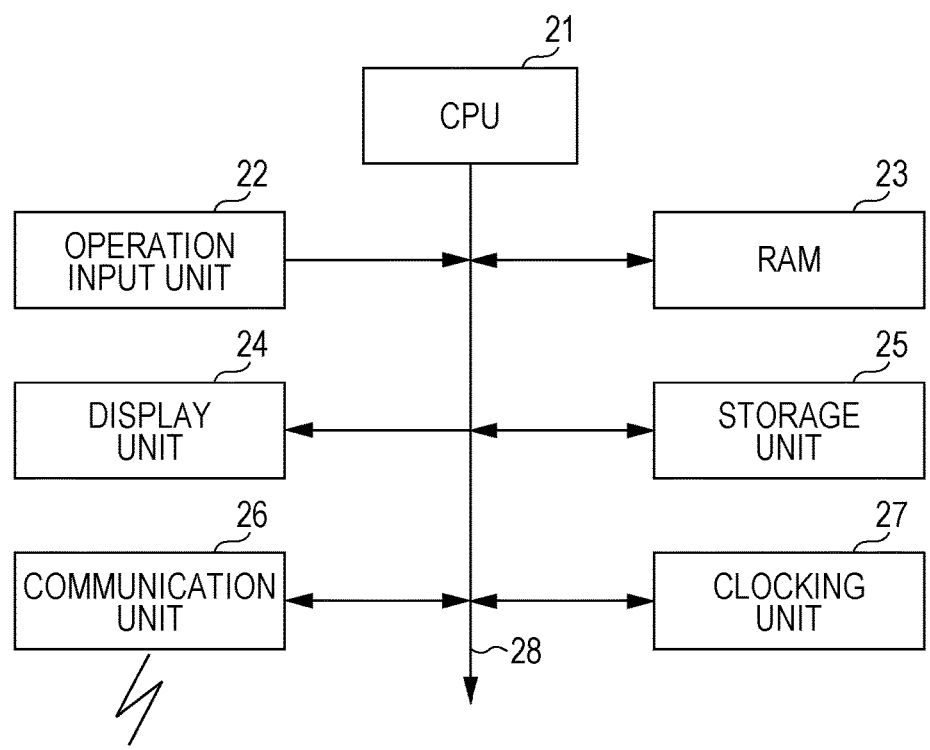
FIG. 2 is a block diagram showing a functional configuration of a server.

The following describes an internal configuration of the server device 2 with reference to FIGS. 2 and 3.

FIG. 2 is a block diagram showing a functional configuration of the server device 2.

As shown in FIG. 2, the server device 2 includes a central processing unit (CPU) 21, an operation input unit 22, a random access memory (RAM) 23, a display unit 24, a storage unit 25, a communication unit 26, and a clocking unit 27. Each of the units is connected via a bus 28.

The CPU 21 reads a system program stored in the storage unit 25, and deploys the system program to a working area of the RAM 23. The CPU 21 controls each unit according to the system program. The CPU 21 also reads a processing program stored in the storage unit 25, and deploys the processing program to the working area. The CPU 21 executes various processing including processing performed by the server device 2 for comment entry processing and indicator analysis display processing to be described later, and functions as a display control unit.

The operation input unit 22 includes a keyboard including cursor keys, character and number input keys, various function keys, and the like. The operation input unit 22 accepts each key press entered by the user, and outputs the operation information to the CPU 21. In addition, the operation input unit 22 may include a pointing device such as a mouse, and may accept a position input and output the position input to the CPU 21 as the operation information.

The RAM 23 is a volatile memory. The RAM 23 includes the working area that stores various programs to be executed, data related to these various programs, and the like.

The display unit 24 includes a liquid crystal display (LCD), a cathode ray tube (CRT), and the like, and displays a screen in response to a display control signal from the CPU 21.

The storage unit 25 includes a nonvolatile storage medium such as a hard disk drive (HDD) and a flash memory including a magnetic recording medium. The storage unit 25 stores, for example, the system program, the processing program, and an application program such as a Web server program, which are executed by the CPU 21, and data necessary for executing these programs. The processing program includes a program for executing various processing including the processing performed by the server device 2 for the comment entry processing and the indicator analysis display processing to be described later.

These programs are stored in the storage unit 25 in the form of computer-readable program code. The CPU 21 sequentially executes the operation according to the program code.

The storage unit 25 also stores various data transmitted from the user terminal 3 (see FIG. 1). For example, the storage unit 25 stores the management data transmitted from the user terminal 3 in a management data table shown in FIG. 3. For example, dates, sales, the number of customers, sales per customer, purchases, cost rates, gross profits, gross profit margins, expenses, labor costs, food and labor costs (FL) rates, and the like are stored as the management data. The labor costs include detailed breakdowns of wages and the like of employees. Here, the FL rate is a rate obtained by dividing the sum of material costs and labor costs by sales, and it is one of the important management indicators in restaurants.

In the management data table shown in FIG. 3, the storage unit 25 also stores the comment information entered and transmitted from the user terminal 3 in association with the date. The storage unit 25 also stores attribute information indicating attributes of the comment information in the management data table. The attribute information includes importance level information, weather information, "like" information, and complaint information. The importance level information indicates the level of importance of each comment information. The weather information is the weather for the date of each comment. The "like" information indicates that a positive thing has happened. The complaint information indicates that a thing needing to be improved has happened. The "like" information can be used to find comment information for when praise has been given from a customer or a business partner or a positive thing has happened to staff or store operations, for example. The complaint information can be used to find comment information for when a thing needing to be improved has happened, for example, receiving a complaint from a customer or a business partner.

The comment information is text information entered by the user in association with the date. It is preferable that the comment information is entered after the close of business on that date. Such comment information may include events coming to the user's attention during day-to-day management, and measures taken by the user to improve management, for example. The importance level information indicates the level of importance of the comment information that has been entered, and the entered comment information is rated on a three-level scale according to the user's selection. The weather information indicates whether it has rained. The "like" information indicates that a positive thing has happened. The complaint information indicates that a thing needing to be improved has happened.

Furthermore, when image data or point of purchase (POP) data is entered and transmitted together with the comment information from the user terminal 3, the storage unit 25 stores the image data or the POP data as additional information of the comment.

Examples of the image data include a photograph of a store taken by the user terminal 3 or the like, and an image of a flyer distributed by the user. Examples of the POP data include POP data created by the management support system 1 executing an application program that performs a POP creation task.

The communication unit 26 includes a modem, a terminal adapter (TA), a router, a network interface controller, and the like. The communication unit 26 communicates with an external device such as the user terminal 3 on the communication network N to transmit and receive data.

The clocking unit 27 incorporates a clocking circuit to clock the current time and date and then output the current time and date as current time information.

FIG. 3 is a view showing the management data table stored in the storage unit 25.

The management data table includes a date field, a sales field, a number-of-customers field, a sales-per-customer field, a purchases field, a cost rate field, a gross profit field, a gross profit margin field, an expenses field, a labor costs field, and an FL rate field. The management data table further includes an importance level field, a "like" information field, a complaint field, a weather field, and a comment field. The information stored in these importance level field, "like" information field, complaint field, and weather field is attribute information of a comment.

<<Operation of Server Device 2>>

The server device 2 configured as described above performs the comment entry processing and the indicator analysis display processing. The comment entry processing will be described with reference to FIGS. 4 to 8.

Figure 4:
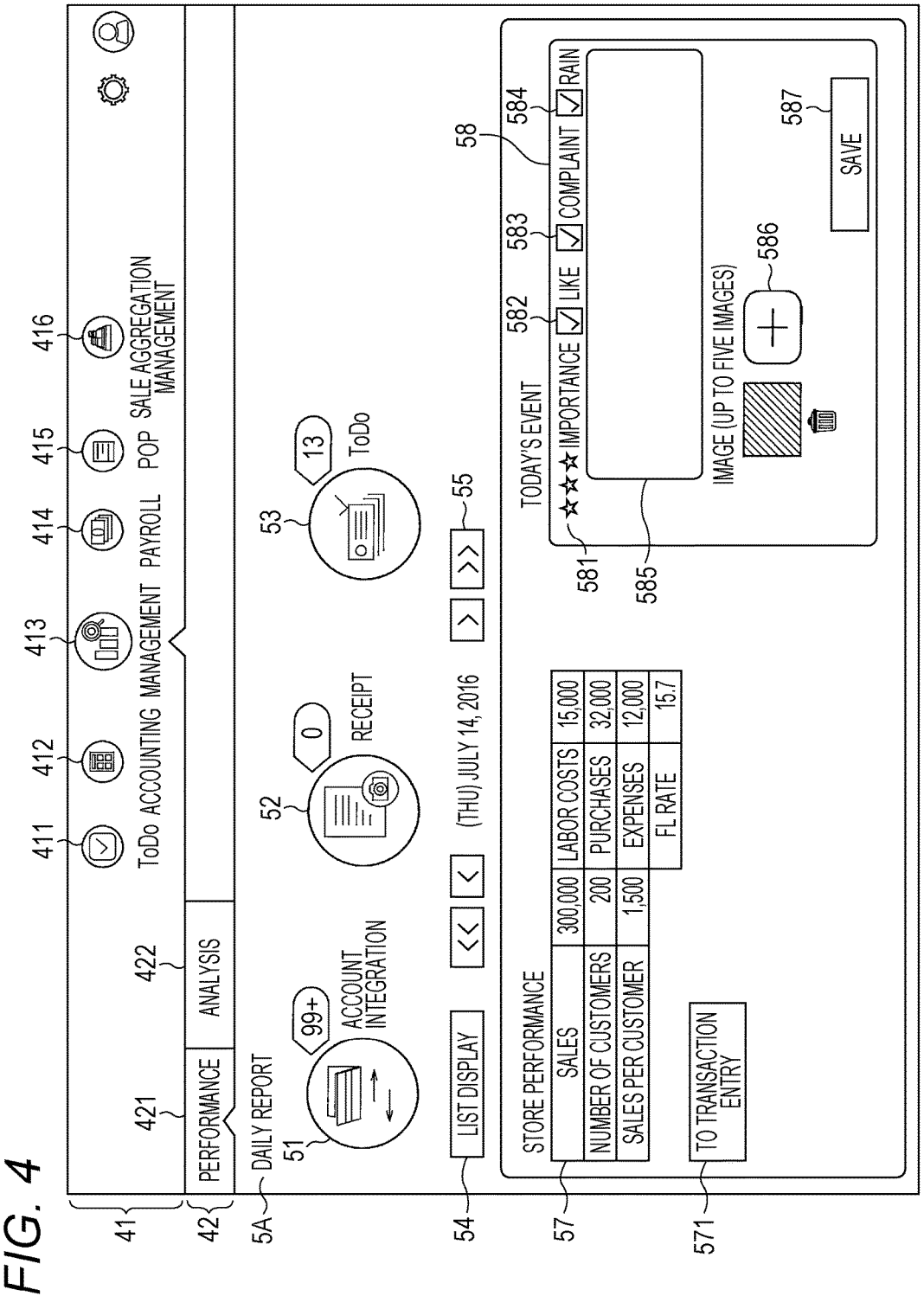
FIG. 4 is a view showing an example of a daily report screen for a case where only an accounting service is subscribed.

FIG. 4 is a view showing an example of the daily report screen 5A for a case where only an accounting service is subscribed. This daily report screen 5A is displayed on a display unit (not shown) of the user terminal 3.

The daily report screen 5A is displayed below an icon area 41 and a menu area 42. In the icon area 41, a To-Do icon 411, an accounting icon 412, a management icon 413, a payroll icon 414, a POP icon 415, and a sales aggregation management icon 416 are displayed. In the menu area 42, a performance menu 421 and an analysis menu 422 are displayed.

The To-Do icon 411 calls a function for managing a To-Do task.

The accounting icon 412 calls an accounting service function for managing deposits and withdrawals relating to the store and performing tax payment processing such as for fixed asset tax and individual business tax. This accounting service function is a basic service for restaurant operators. Data necessary for management analysis such as purchases, sales, and the number of customers is entered through this accounting service function.

The management icon 413 calls a management analysis function that refers to the information relating to the sales management tasks described above. This management analysis function is provided to the user in sets with the accounting service function.

The payroll icon 414, the POP icon 415, and the sales aggregation management icon 416 described below are optional functions. The payroll icon 414 calls a payroll management task function for calculating employees' wages as well as a work management function. Data necessary for a work record is entered through these payroll management task function and work management function.

The POP icon 415 calls a POP creation task function for creating a POP. The POP is an advertisement medium used in stores and the like for sales promotion. The sales aggregation management icon 416 calls a function for aggregating sales registration data of each register and integrating the data into the "accounting".

This daily report screen 5A is a screen displayed when the management icon 413 is selected followed by the performance menu 421. On this daily report screen 5A, an account integration button 51, a receipt button 52, and a To-Do button 53 are displayed. Below these buttons, a list display button 54 and date selection buttons 55 are displayed. An accounting area 57 and a "today's event" area 58 are displayed below these buttons.

When the analysis menu 422 is selected on the daily report screen 5A, the screen transitions to the indicator analysis screen 8 (see FIG. 11) to be described later.

The account integration button 51, the receipt button 52, and the To-Do button 53 constitute respective backlog areas. On the upper right of the account integration button 51, the number of pieces of unprocessed information relating to deposits and withdrawals is displayed. Selecting the account integration button 51 allows checking of information such as automatic withdrawals from the user's account of a financial institution that the management support system 1 is integrated with.

On the upper right of the receipt button 52, the number of unprocessed receipts or the like is displayed. Selecting this receipt button 52 allows checking of image data of receipts photographed and stored by the user terminal 3. The receipts are, for example, the ones issued upon the purchase of goods.

On the upper right of the To-Do button 53, the number of unprocessed To-Do items is displayed. Selecting this To-Do button 53 allows checking of tasks that should be or must be processed at a predetermined time, such as business account settlement, declaration, and wage provision processing, among the tasks to be processed using the application program executed by the management support system 1.

Since these backlog areas are displayed on the daily report screen 5A or the like, the user can enter comment information while checking and processing other tasks executed by the management support system 1.

The list display button 54 is a button for transitioning to the list display screen 7 (see FIGS. 9 and 10) to be described later. The date selection buttons 55 allow selection of the date of a daily report. When the user selects the button farthest to the left of the date selection buttons 55, the CPU 21 changes the target date to the date one week before. When the user selects the second button from the left, the CPU 21 changes the target date to the date one day before.

When the user selects the date itself, the CPU 21 displays a calendar control, allowing the user to change the target date to any date. When the user selects the second button from the right, the CPU 21 changes the target date to the date one day after. When the user selects the button farthest to the right, the CPU 21 changes the target date to the date one week after.

When the date is changed by any of these date selection buttons 55, the accounting area 57 and the "today's event" area 58 are changed to those for the corresponding date.

The accounting area 57 displays numerical values and the like of the management data acquired for the date selected by one of the date selection buttons 55. Furthermore, the accounting area 57 displays a "to transaction entry" button 571. As the management data, sales, the number of customers, sales per customer, labor costs, purchases, expenses, and an FL rate are displayed here.

By clicking this "to transaction entry" button 571, the screen transitions to a transaction entry screen (not shown).

The "today's event" area 58 displays a comment entry text box 585, "importance" entry buttons 581, a "like" check box 582, a "complaint" check box 583, a "rain" check box 584, an additional information entry button 586, and a save button 587. This "today's event" area 58 is for entering comment information corresponding to the selected date.

The comment entry text box 585 is a text box for entering comment information corresponding to the selected date and displays a message "leave notes, comment, etc." in the initial state. When the comment information corresponding to the selected date has already been entered, the comment information is displayed in an editable manner.

The "importance" entry buttons 581 are for entering information on importance as an attribute of this comment information. For example, when the user clicks the first star mark from the left, the importance level information is entered as "1". When the user clicks the second star mark, the importance level information is entered as "2". Similarly, when the user clicks the third star mark, the importance level information is entered as "3". By default, the importance level information is "0".

The "like" check box 582 is for entering that a positive thing has happened. The information is an attribute of this comment information. The "complaint" check box 583 is for entering that a thing needing to be improved has happened. The information is an attribute of this comment information. The "rain" check box 584 is for entering whether it has rained on the selected date.

The additional information entry button 586 is for entering image information such as image data and POP data. Clicking a portion "+" displayed in a rectangle on the right side opens a file selection dialog. The number of pieces of additional information is limited to five. When the number reaches five, the rectangle displayed with "+" is not displayed. A hatched rectangle on the left side schematically indicates a thumbnail of an uploaded image. By clicking this thumbnail, the user can check the image in full size. By clicking a bucket button displayed below the thumbnail, the user can delete the uploaded image.

The save button 587 is for saving the contents entered in this "today's event" area 58.

FIG. 5 is a view showing an example of a daily report for printing 6A for a case where only the accounting service is subscribed.

When the user clicks a print button (not shown) on the daily report screen 5A shown in FIG. 4, this daily report for printing 6A is printed by the printing device 31. The daily report for printing 6A includes a date field 61, an importance level field 62, a weather field 63, a today's sales performance table 65, and a comment field 66.

In the date field 61, the date of this daily report is printed. In the importance level field 62, star marks are printed. The number of star marks indicates the importance level of the comment of this daily report. In the weather field 63, an umbrella icon is printed, indicating that it has rained on the date of this daily report.

In the today's sales performance table 65, a sales performance table for the date of this daily report is printed. In the comment field 66, a comment for the date of this daily report is printed. With this configuration, the user can not only check the daily report screen 5A on the screen of the user terminal 3 but also accumulate day-to-day sales information by printing and filing the corresponding daily report.

FIG. 6 is a view showing an example of the daily report screen 5B for a case where accounting and payroll services are subscribed. Elements identical to those of the daily report screen 5A shown in FIG. 4 are denoted with identical reference signs.

On this daily report screen 5B, the account integration button 51, the receipt button 52, and the To-Do button 53 are displayed in a similar manner to those of the daily report screen 5A (see FIG. 4). Below these buttons, the list display button 54 and the date selection buttons 55 are displayed. Furthermore, a payroll area 56, the accounting area 57, and the "today's event" area 58 are displayed.

The payroll area 56 displays numerical values and the like of payroll data acquired for the date selected by one of the date selection buttons 55. This payroll area 56 includes any employees whose start time has been registered regardless of whether the management support system 1 is integrated with time cards.

Areas other than the payroll area 56 are similar to those of the daily report screen 5A.

Hereinafter, when the daily report screens 5A and 5B are not particularly distinguished from each other, the daily report screens 5A and 5B will be simply referred to as a daily report screen 5.

FIG. 7 is a view showing an example of a print image of a daily report for a case where the accounting and payroll services are subscribed. Elements identical to those of the daily report for printing 6A shown in FIG. 5 are denoted with identical reference signs.

A daily report for printing 6B includes the date field 61, the importance level field 62, the weather field 63, a today's work record table 64, the today's sales performance table 65, and the comment field 66.

The today's work record table 64 displays numerical values and the like of payroll data acquired for the date of the date field 61. Any other fields are similar to those of the daily report for printing 6A.

Hereinafter, when the daily report for printing 6A and 6B are not particularly distinguished from each other, the daily report for printing 6A and 6B will be simply referred to as a daily report for printing 6.

Figure 8:
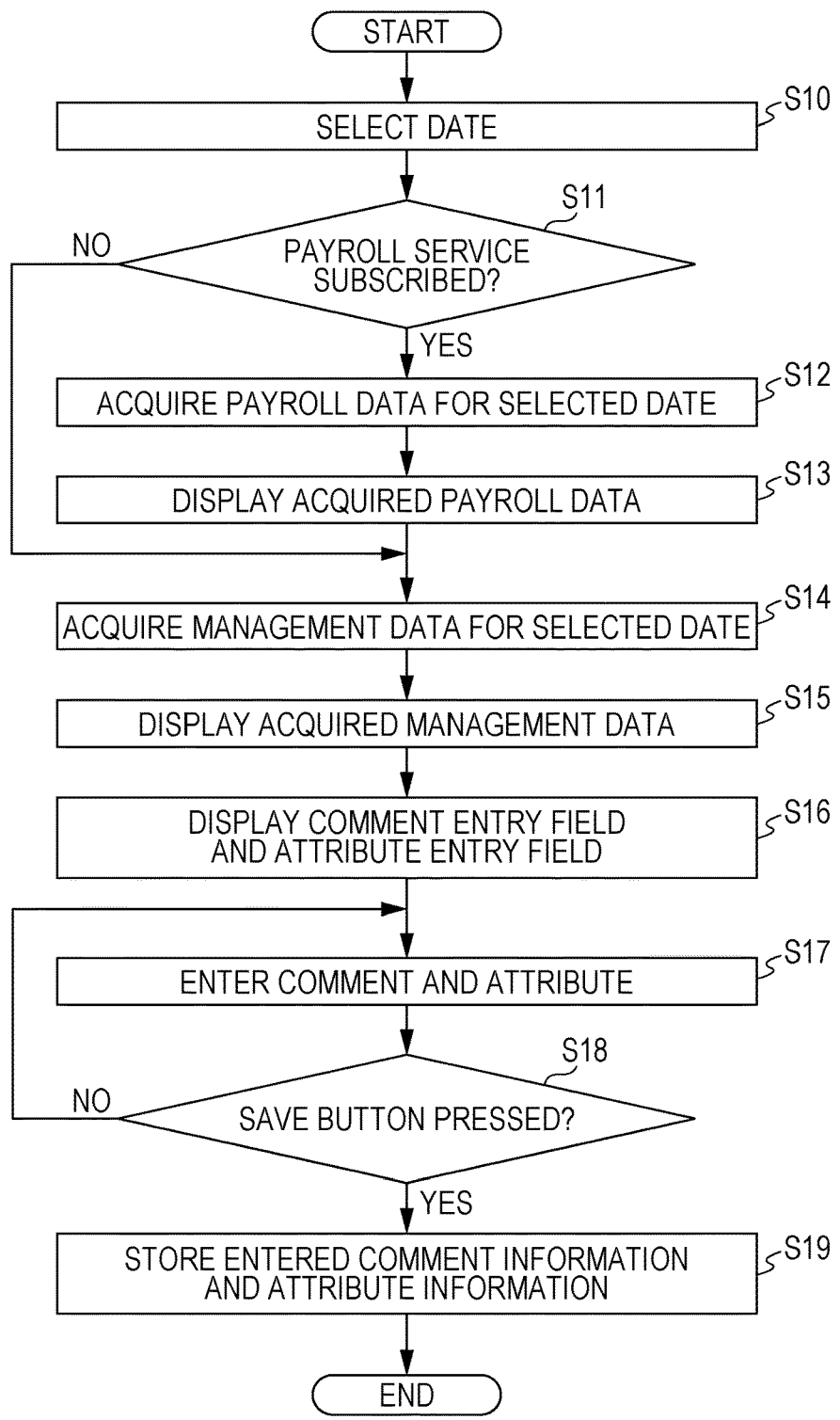
FIG. 8 is a flowchart showing an example of comment entry processing performed by the server.

FIG. 8 is a flowchart showing an example of the comment entry processing performed by the server device 2.

As shown in FIG. 8, when the communication unit 26 receives an access request to the daily report screen 5 from the user terminal 3, the CPU 21 of the server device 2 selects a date on the basis of the operation information received from the user terminal 3 (step S10).

Subsequently, the CPU 21 determines whether the user of this user terminal 3 subscribes to the payroll service (step S11). If the user subscribes to the payroll service (step S11→Yes), the CPU 21 acquires payroll data of the selected date from the storage unit 25 (step S12). The CPU 21 then displays this payroll data on the daily report screen 5 (step S13).

If the user does not subscribe to the payroll service (step S11→No), the CPU 21 proceeds to the processing in step S14.

In step S14, the CPU 21 acquires management data for the selected date from the storage unit 25 to display the management data on the daily report screen 5. The CPU 21 displays this management data on the daily report screen 5 (step S15). Subsequently, the comment entry text box 585 for entering comment information as well as the attribute entry field for entering attribute information are displayed on the daily report screen 5 by the CPU 21 (step S16).

In step S17, the user enters, for example, events coming to the user's attention or measures taken during management on the selected date in the comment entry text box 585 while checking the management data on the daily report screen 5 displayed on the user terminal 3. In addition, the user rates the importance level of the comment entered in the comment entry text box 585 on a three-level scale using the "importance" entry buttons 581. When it has rained on the selected date, the user checks the "rain" check box 584. When there is image data or POP data relating to the comment entered in the comment entry text box 585, the user selects the additional information entry button 586 and enters this image data or POP data.

Subsequently, the CPU 21 determines whether the save button 587 has been pressed (clicked) (step S18). When it is determined that the save button 587 has been pressed (step S18→YES), the CPU 21 causes the storage unit 25 to store the comment information, the attribute information, and the like that have been entered (step S19), and ends the comment entry processing. When one or both of the image data and the POP data is entered, the CPU 21 also causes the storage unit 25 to store the corresponding one or both of the image data and the POP data.

The CPU 21 performs the comment entry processing in this way.

<<List Display Processing>>

List display processing will be described with reference to FIGS. 9 and 10.

FIG. 9 is a view showing a search condition pane 71 on the list display screen 7 of the daily report.

The list display screen 7 is a transition screen which is displayed when the list display button 54 is clicked on the daily report screen 5 shown in FIGS. 4 and 6. The list display screen 7 is displayed below the menu area 42. This list display screen 7 is displayed, including the search condition pane 71, a search button 73, a clear button 74, a search option button 75, and a list display 76 (see FIG. 10).

The search condition pane 71 includes a period field 711, a day-of-week field 712, a sales field 713, a number-of-employees field 714, an employee field 715, an importance level field 716, a "like" field 717, a complaint field 718, a weather field 719, an image field 720, and a comment field 721.

The period field 711 is for specifying a search period. The date of the system is set by default. Here, the period from May 1, 2016 to May 31, 2016 is assumed to be set by the user. When no other condition is set, the number of search results is 31 for 31 days.

When the period field 711 is set to May 1, 2016 to Jun. 30, 2016 and no other conditions are set, the number of search results is 61. This is the sum of 31 days for May and 30 days for June.

The day-of-week field 712 is for specifying a day of the week by a check box. "Not specified" is set by default. The sales field 713 is for specifying a range of the sales proceeds of the day. "Not specified" is set by default. Values to be entered in the sales field 713 are restricted such that the value in the right field is greater than the value entered in the left field.

The number-of-employees field 714 is for specifying, as a search condition, the number of employees whose start time has been set in the work record. "Not specified" is set by default. The employee field 715 is for displaying a pull-down list that includes all of the employees who have been on duty on that day, and setting the date on which a selected employee has been on duty as a search condition. "Not specified" is set by default.

The importance level field 716 is for specifying the importance level. "Not specified", "importance level 0", "importance level 1", "importance level 2", and "importance level 3" are displayed in a pull-down list. "Not specified" is set by default.

The "like" field 717 is for specifying the presence or absence of "like". "Not specified", "like", and "no like" are displayed in a pull-down list. "Not specified" is set by default.

The complaint field 718 is for specifying the presence or absence of a complaint. "Not specified", "complaint", "no complaint" are displayed in a pull-down list. "Not specified" is set by default.

The weather field 719 is for specifying whether it has rained. "Not specified", "rain", "other than rain" are displayed in a pull-down list. "Not specified" is set by default.

The image field 720 is for specifying the presence or absence of an image. "Not specified", "with image", and "none" are displayed in a pull-down list. "Not specified" is set by default.

The comment field 721 is for searching for partial matches of the entered comment. "Not specified" is set by default.

The search button 73 is for executing a search with the conditions set in the search condition pane 71. The clear button 74 is for clearing the conditions in the search condition pane 71 and returning to the default conditions. The search option button 75 is for setting search conditions other than those in the search condition pane 71. When the search option button 75 is clicked, for example, a screen for specifying a blank comment field as a search condition may appear and conduct the search. Such a search lists any days on which no comment has been entered, allowing the user to enter comments at later days.

FIG. 10 is a view showing an example of the list display 76 on the list display screen 7 of the daily report.

The list display 76 displays the results of the search specified by the search condition pane 71. The search results are displayed with groups of five results per page, and sorted in ascending date order. The search results include any day regardless of whether it is a regular holiday or a holiday, and whether there exists data. This is to avoid situations that items forgotten to be entered do not appear in the list even though the store has actually opened on that day, and thus the user is unable to edit such items. Here, each of pieces of information for 31 days (31 results) for May is stored in a corresponding one of seven pages. The pieces of information listed in the seven pages can be viewed by switching the pages using page number buttons, a back button, or a next button. The page number button corresponding to the page being displayed is highlighted. The page being displayed also displays the ordinal number of data included in the list being displayed among the total search results.

The list display 76 includes a date field, a sales field, a number-of-employees field, an importance field, a "like" field, a complaint field, a weather field, a comment field, an image field, and an edit field. Among these fields, the date field, the sales field, the number-of-employees field, the importance field, the "like" field, the complaint field, the weather field, and the comment field display the corresponding information of the management data table (see FIG. 3). The image field displays a thumbnail of a corresponding image file linked to the management data table in FIG. 3.

May 2 and 3 exemplify a situation where both days are included in the search results, but respective pieces of information are not stored in the management data table in FIG. 3. In such a case, the date field is displayed, but the sales field, the number-of-employees field, the importance field, the "like" field, the complaint field, the weather field, and the comment field are displayed as blank.

The edit field includes a button for calling the daily report screen 5 for a corresponding daily report. With this button, the user can enter various information for the date on which information has not been entered.

<<Indicator Analysis Display Processing>>

The indicator analysis display processing will be described with reference to FIGS. 11 to 14.

Figure 11:
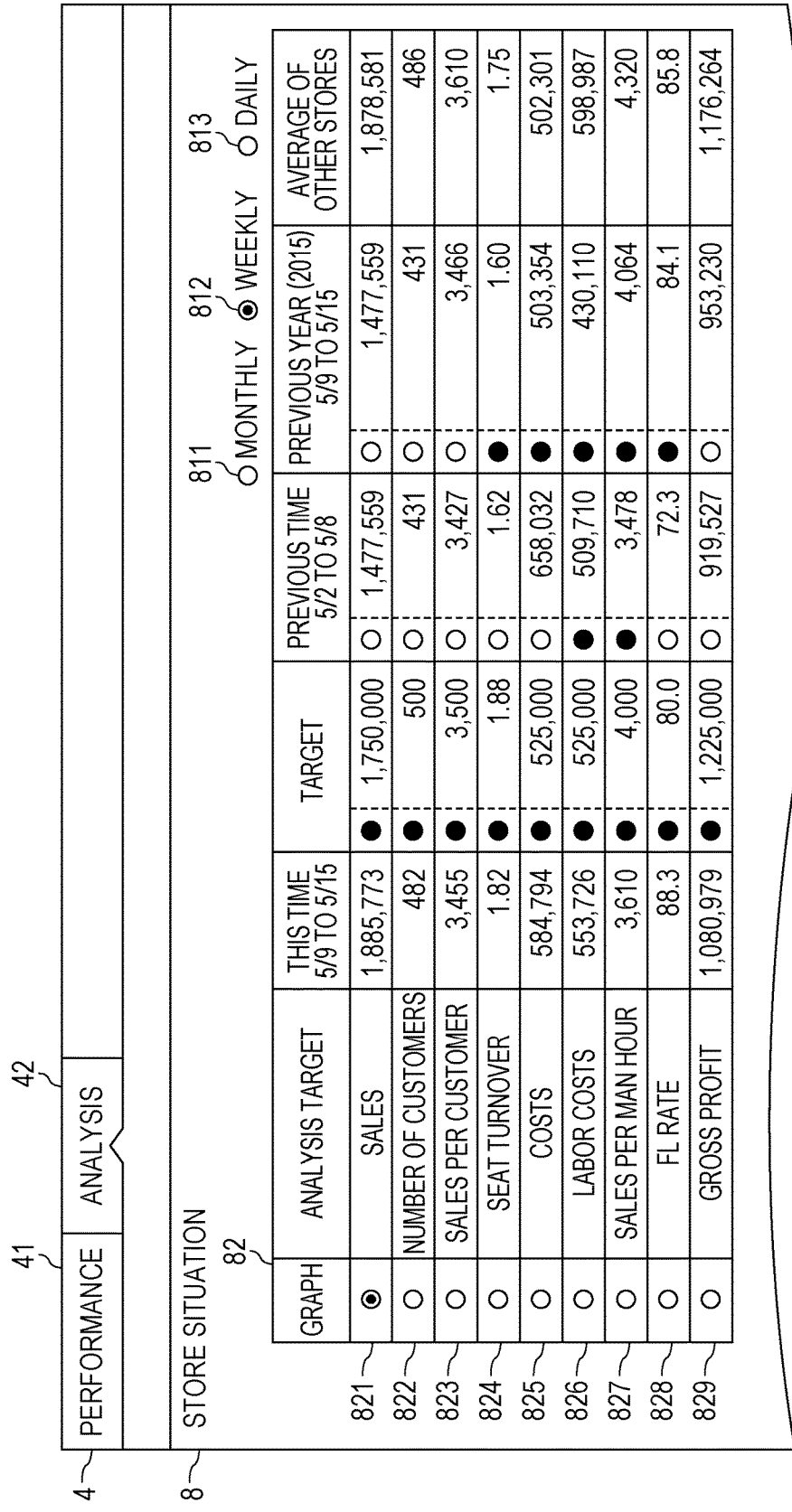
FIG. 11 is a view showing an example of a management data table on an indicator analysis screen.

FIG. 11 is a view showing an example of a management data table 82 on the indicator analysis screen 8.

Selecting the analysis menu 422 on the daily report screen (see FIGS. 4 and 6) makes a transition to this indicator analysis screen 8.

The indicator analysis screen 8 includes a monthly switching radio button 811, a weekly switching radio button 812, and a daily switching radio button 813, the management data table 82, an indicator analysis graph 83 (see FIG. 12), and the like. The monthly switching radio button 811, the weekly switching radio button 812, and the daily switching radio button 813 constitute a scale area. The management data table 82 constitutes a graph element area. The indicator analysis graph 83 constitutes a graph area.

The monthly switching radio button 811, the weekly switching radio button 812, and the daily switching radio button 813 constituting the scale area determine the scale of the management data table 82 and the indicator analysis graph 83. Weekly is set by default. Switching the scale by operating this scale area can change the scale of the management data table 82 and the indicator analysis graph 83.

Here, the target date is assumed to be Jun. 16, 2016. In this case, when the daily switching radio button 813 is selected, the target date for this time is June 16 of the same year, the target date for the previous time is June 15 of the same year, and the target date for the previous year is Jun. 16, 2015.

When the weekly switching radio button 812 is selected, the target dates for this time are from June 10 to June 16 of the same year, the target dates for the previous time are from June 3 to June 9 of the same year, and the target dates for the previous year are from Jun. 10, 2015 to Jun. 16, 2015.

When the monthly switching radio button 811 is selected, the target dates for this time are from June 1 to June 16 of the same year, the target dates for the previous time are from May 1 to May 31 of the same year, and the target dates for the previous year are from Jun. 1, 2015 to Jun. 16, 2015.

The management data table 82 constituting the graph element area displays concrete numerical values of the management data for "this time", "previous time", and "previous year" calculated on the basis of the acquired management data, along with "target", and "average of other stores".

The "this time" displays various indicators for this time on the specified scale. Since "weekly" is specified here, indications from May 9, 2016 to May 15 of the same year are displayed.

The "previous time" displays various indicators for the previous time on the specified scale. Since "weekly" is specified here, indicators from May 2, 2016 to May 8 of the same year are displayed.

The "previous year" displays various indicators for the same period of the previous year, corresponding to the period for "this time". Since "weekly" is specified here, indicators from May 9, 2015 to May 15 of the same year are displayed.

The "target" displays a target value of the corresponding management data.

The "average of other stores" displays an average value of the corresponding management data of the same type of industry as the pre-registered type of industry to which the user belongs. The period thereof corresponds to the period for "this time".

<<Method of Calculating Sales>>

When the analysis target is "sales" and the scale is "daily", the "this time" displays the sales value of the target date. When the target date is a holiday, the "target" displays the holiday sales target. When the target date is a weekday, the "target" displays the weekday sales target. The "previous time" displays the sales value for the day before the target date. The "previous year" displays the sales value for the same day one year before.

When the scale is "weekly" or "monthly", the "this time" displays the total sale value in the aggregation period. The "target" displays the sum of the product of the number of holidays in the aggregation period and the holiday sales target and the product of the number of weekdays in the aggregation period and the weekday sales target. This is indicated in the following equation (1).

[Mathematical Formula 1]

$$S_t = D_h S_h + D_w S_w \tag{1}$$

where
St: Target sales
Dh: Number of holidays in the aggregation period
Sh: Holiday sales target
Dw: Number of weekdays in the aggregation period
Sw: Weekday sales target The "previous time" displays the total sale value in the aggregation period. The "previous year" displays the total sale value in the same aggregation period one year before.

<<Method of Calculating the Number of Customers>>

When the analysis target is the "number of customers" and the scale is "daily", the "this time" displays the number of customers for the target date. When the target date is a holiday, the "target" displays the target number of customers for holidays. When the target date is a weekday, the "target" displays the target number of customers for weekdays. The "previous time" displays the number of customers for the day before the target date. The "previous year" displays the number of customers for the same day one year before.

When the scale is "weekly" or "monthly", the "this time" displays the total number of customers in the aggregation period. The "target" displays the sum of the product of the number of holidays in the aggregation period and the target number of customers for holidays and the product of the number of weekdays in the aggregation period and the target number of customers for weekdays. This is indicated in the following equation (2).

[Mathematical Formula 2]

$$C_t = D_h C_h + D_w C_w \quad (2)$$

where
Ct: Target number of customers
Dh: Number of holidays in the aggregation period
Ch: Target number of customers for holidays
Dw: Number of weekdays in the aggregation period
Cw: Target number of customers for weekdays The "previous time" displays the total number of customers in the aggregation period. The "previous year" displays the total number of customers in the same aggregation period one year before.

<<Method of Calculating Sales Per Customer>>

When the analysis target is "sales per customer" and the scale is "daily", the "this time" displays the sales per customer for the target date. When the target date is a holiday, the "target" displays the target sales per customer for holidays. When the target date is a weekday, the "target" displays the target sales per customer for weekdays. The "previous time" displays the sales per customer for the day before the target date. The "previous year" displays the sales per customer for the same day one year before.

When the scale is "weekly" or "monthly", the "this time" displays the value obtained by dividing the total of sales per customer in the aggregation period by the number of aggregation days. The "target" displays the value obtained by dividing, by the number of aggregation days, the sum of the product of the number of holidays in the aggregation period and the target sales per customer for holidays and the product of the number of weekdays in the aggregation period and the target sales per customer for weekdays. This is indicated in the following equation (3). The number of aggregation days may be obtained by adding the number of holidays and the number of weekdays in the aggregation period.

[Mathematical Formula 3]

$$P_t = (D_h P_h + D_w P_w)/D_a \quad (3)$$

where
Pt: Target sales per customer
Dh: Number of holidays in the aggregation period
Ph: Target sales per customer for holidays
Dw: Number of weekdays in the aggregation period
Pw: Target sales per customer for weekdays
Da: Number of aggregation days (=Dh+Dw)

The "previous time" displays the value obtained by dividing the total of sales per customer in the aggregation period by the number of aggregation days. The "previous year" displays the value obtained by dividing the total of sales per customer in the same aggregation period one year before by the number of aggregation days.

<<Method of Calculating Seat Turnover>>

When the analysis target is "seat turnover" and the scale is "daily", the "this time" displays the seat turnover for the target date. When the target date is a holiday, the "target" displays the value obtained by dividing the target number of customers for holidays by the number of seats. When the target date is a weekday, the "target" displays the value obtained by dividing the target number of customers for weekdays by the number of seats. The "previous time" displays the seat turnover for the day before the target date. The "previous year" displays the seat turnover for the same day one year before.

When the scale is "weekly" or "monthly", "this time" displays the value obtained by dividing the total of seat turnovers in the aggregation period by the number of aggregation days. The "target" displays the value obtained by dividing the sum of the product of the number of holidays in the aggregation period and the target number of customers for holidays and the product of the number of weekdays in the aggregation period and the target number of customers for weekdays by the product of the number of aggregation days and the number of seats. This is indicated in the following equation (4).

[Mathematical Formula 4]

$$H_t = (D_h C_h + D_w C_w)/\{D_a H_n\} \quad (4)$$

where
Ht: Target seat turnover
Dh: Number of holidays in the aggregation period
Ch: Target number of customers for holidays
Dw: Number of weekdays in the aggregation period
Cw: Target number of customers for weekdays
Da: Number of aggregation days (=Dh+Dw)
Hn: Number of seats The "previous time" displays the value obtained by dividing the total of seat turnovers in the aggregation period by the number of aggregation days. The "previous year" displays the value obtained by dividing the total of seat turnovers in the same aggregation period one year before by the number of aggregation days.

<<Method of Calculating Sales Per Unit Area>>

When the analysis target is "sales per unit area" (not shown) and the scale is "daily", the "this time" displays the sales per unit area for the target date. When the target date is a holiday, the "target" displays the value obtained by dividing the holiday sales target by the floor area. When the target date is a weekday, the "target" displays the value obtained by dividing the weekday sales target by the floor area. The "previous time" displays the sales per unit area for the day before the target date. The "previous year" displays the sales per unit area for the same day one year before.

When the scale is "weekly" or "monthly", the "this time" displays the value obtained by dividing the total of sales per unit area in the aggregation period by the number of aggregation days. The "target" displays the value obtained by dividing the sum of the product of the number of holidays in the aggregation period and the holiday sales target and the product of the number of weekdays in the aggregation period and the weekday sales target by the product of the number of aggregation days and the floor area. This is indicated in the following equation (5).

[Mathematical Formula 5]

$$A_t = (D_h S_h + D_w S_w) / \{D_a A_n\} \quad (5)$$

where
At: Target sales per unit area
Dh: Number of holidays in the aggregation period
Sh: Holiday sales target
Dw: Number of weekdays in the aggregation period
Sw: Weekday sales target
Da: Number of aggregation days (=Dh+Dw)
An: Floor area The "previous time" displays the value obtained by dividing the total of sales per unit area in the aggregation period by the number of aggregation days. The "previous year" displays the value obtained by dividing the total of sales per unit area in the same aggregation period one year before by the number of aggregation days.

<<Method of Calculating Costs>>

When the analysis target is "costs" and the scale is "daily", the "this time" displays the sum of the purchases and expenses for the target date. When the target date is a holiday, the "target" displays the product of the holiday sales target and the target cost rate. When the target date is a weekday, the "target" displays the product of the weekday sales target and the target cost rate. The "previous time" displays the sum of the purchases and expenses for the day before the target date. The "previous year" displays the sum of the purchases and expenses for the same day one year before.

When the scale is "weekly" or "monthly", the "this time" displays the total sum of the purchases and expenses in the aggregation period. The "target" displays the value obtained as follows: the sum of the product of the number of holidays in the aggregation period and the holiday sales target and the product of the number of weekdays in the aggregation period and the weekday sales target is multiplied by the value obtained by dividing the target cost rate by 100. This is indicated in the following equation (6).

[Mathematical Formula 6]

$$O_t = (D_h S_h + D_w S_w)(C_r / 100) \quad (6)$$

where
Ot: Target costs
Dh: Number of holidays in the aggregation period
Sh: Holiday sales target
Dw: Number of weekdays in the aggregation period
Sw: Weekday sales target
Cr: Target cost rate The "previous time" displays the total sum of the purchases and expenses in the aggregation period. The "previous year" displays the total sum of the purchases and expenses in the same aggregation period one year before.

<<Method of Calculating Labor Costs>>

When the analysis target is "labor costs" and the scale is "daily", the "this time" displays the labor costs for the target date. The "target" displays the target labor costs. The "previous time" displays the labor costs for the day before the target date. The "previous year" displays the labor costs for the same day one year before.

When the scale is "weekly" or "monthly", the "this time" displays the total of labor costs in the aggregation period. The "target" displays the product of the target labor costs in the aggregation period and the number of aggregation days. The "previous time" displays the total of labor costs in the aggregation period. The "previous year" displays the total of labor costs in the same aggregation period one year before.

<<Method of Calculating Sales Per Man Hour>>

When the analysis target is "sales per man hour" and the scale is "daily", the "this time" displays the sales per man hour for the target date. When the target date is a holiday, the "target" displays the value obtained by dividing the holiday sales target by the target labor hours. When the target date is a weekday, the "target" displays the value obtained by dividing the weekday sales target by the target labor hours. The "previous time" displays the sales per man hour for the day before the target date. The "previous year" displays the sales per man hour for the same day one year before.

When the scale is "weekly" or "monthly", the "this time" displays the value obtained by dividing the total sale value in the aggregation period by the total of labor hours in the aggregation period. The "target" displays the value obtained by dividing the sum of the product of the number of holidays in the aggregation period and the holiday sales target and the product of the number of weekdays in the aggregation period and the weekday sales target by the product of the number of aggregation days and the target labor hours. This is indicated in the following equation (7).

[Mathematical Formula 7]

$$M_t = (D_h S_h + D_w S_w) / D_a L_n \quad (7)$$

where
Mt: Target sales per man hour
Dh: Number of holidays in the aggregation period
Sh: Holiday sales target
Dw: Number of weekdays in the aggregation period
Sw: Weekday sales target
Da: Number of aggregation days
Ln: Target labor hours The "previous time" displays the value obtained by dividing the total sale value in the aggregation period by the total of labor hours. The "previous year" displays the value obtained by dividing the total sale value in the same aggregation period one year before by the total of labor hours.

<<Method of Calculating FL Rate>>

When the analysis target is "FL rate" and the scale is "daily", the "this time" displays the value obtained by dividing the sum of the purchases and the labor costs for the target date by the sales. The "target" displays the target FL rate. The "previous time" displays the value obtained by dividing the sum of the purchases and the labor costs for the day before the target date by the sales. The "previous year" displays the FL rate for the same day one year before.

When the scale is "weekly" or "monthly", the "this time" displays the value obtained by dividing the sum of the total of purchases and the total of labor costs in the aggregation period by the total sale value. The "target" displays the target FL rate. The "previous time" displays the value obtained by dividing the sum of the total of purchases and the total of labor costs in the aggregation period by the total sale value. The "previous year" displays the value obtained by dividing the sum of the total of purchases and the total of labor costs in the same aggregation period one year before by the total sale value.

<<Method of Calculating Labor Cost Rate>>

When the analysis target is "labor cost rate" (not shown) and the scale is "daily", the "this time" displays the labor cost rate for the target date. When the target date is a holiday, the "target" displays the value obtained by dividing the target labor costs by the holiday sales target. When the target date is a weekday, the "target" displays the value obtained by dividing the target labor costs by the weekday sales target. The "previous time" displays the labor cost rate for the day before the target date. The "previous year" displays the labor cost rate for the same day one year before.

When the scale is "weekly" or "monthly", the "this time" displays the value obtained by dividing the total of labor cost rates in the aggregation period by the number of aggregation days. The "target" displays the value obtained as follows: the product of the target labor costs and the number of aggregation days is divided by the sum of the product of the number of holidays in the aggregation period and the holiday sales target and the product of the number of weekdays in the aggregation period and the weekday sales target, and the resulting value is multiplied by 100. This is indicated in the following equation (8).

[Mathematical Formula 8]

$$Q_t = \left\{ \frac{(D_a C_p)}{(D_h S_h + D_w S_w)} \right\} \times 100 \qquad (8)$$

where
Qt: Target labor cost rate
Da: Number of aggregation days
Cp: Target labor costs
Dh: Number of holidays in the aggregation period
Sh: Holiday sales target
Dw: Number of weekdays in the aggregation period
Sw: Weekday sales target The "previous time" displays the value obtained by dividing the total of labor cost rates in the aggregation period by the number of aggregation days. The "previous year" displays the value obtained by dividing the total of labor cost rates in the same aggregation period one year before by the number of aggregation days.

<<Method of Calculating Gross Profit>>

When the analysis target is "gross profit" and the scale is "daily", the "this time" displays the gross profit for the target date. When the target date is a holiday, the "target" displays the value obtained by subtracting the target cost rate from 1 and multiplying the resulting value by the holiday sales target. When the target date is a weekday, the "target" displays the value obtained by subtracting the target cost rate from 1 and multiplying the resulting value by the weekday sales target. The "previous time" displays the gross profit for the day before the target date. The "previous year" displays the gross profit for the same day one year before.

When the scale is "weekly" or "monthly", the "this time" displays the total of gross profits in the aggregation period. The "target" displays the value obtained as follows: the sum of the product of the number of holidays in the aggregation period and the holiday sales target and the product of the number of weekdays in the aggregation period and the weekday sales target is multiplied by the value obtained by subtracting the target cost rate from 100 and dividing the resulting value by 100. This is indicated in the following equation (9).

[Mathematical Formula 9]

$$G_t = (D_h S_h + D_w S_w) \times \left( \frac{100 - P_r}{100} \right) \qquad (9)$$

where
Gt: Target gross profit
Dh: Number of holidays in the aggregation period
Sh: Holiday sales target
Dw: Number of weekdays in the aggregation period
Sw: Weekday sales target
Pr: Target cost rate The "previous time" displays the total of gross profits in the aggregation period. The "previous year" displays the total of gross profits in the same aggregation period one year before.

To indicate a result of comparison with the management data for "this time", a white circle or a black circle is displayed adjacent to each of the numerical values of the management data in the "target", "previous time", and "previous year" fields. That is, each white circle indicates superiority of the management data for "this time" over the management data for the corresponding "target", "previous time", or "previous year". Each black circle indicates inferiority of the management data for "this time" over the management data for the corresponding "target", "previous time", or "previous year".

The management data table 82 includes radio buttons 821 to 829. The radio button 821 is for selecting the "sales" as the values to be displayed in the indicator analysis graph 83. The radio button 822 is for selecting the "number of customers" as the values to be displayed in the indicator analysis graph 83. The radio button 823 is for selecting the "sales per customer" as the values to be displayed in the indicator analysis graph 83.

The radio button 824 is for selecting the "seat turnover" as the values to be displayed in the indicator analysis graph 83. The radio button 825 is for selecting the "costs" as the values to be displayed in the indicator analysis graph 83. The radio button 826 is for selecting the "labor costs" as the values to be displayed in the indicator analysis graph 83.

The radio button 827 is for selecting the "sales per man hour" as the values to be displayed in the indicator analysis graph 83. The radio button 828 is for selecting the "FL rate" as the values to be displayed in the indicator analysis graph 83. The radio button 829 is for selecting the "gross profit" as the values to be displayed in the indicator analysis graph 83.

The items displayed here are intended for restaurants. In a case where the type of industry is other than restaurants, the item "sales per unit area" may be displayed instead of the "seat turnover", and the item "labor cost rate" may be displayed instead of the "FL rate".

Figure 12:
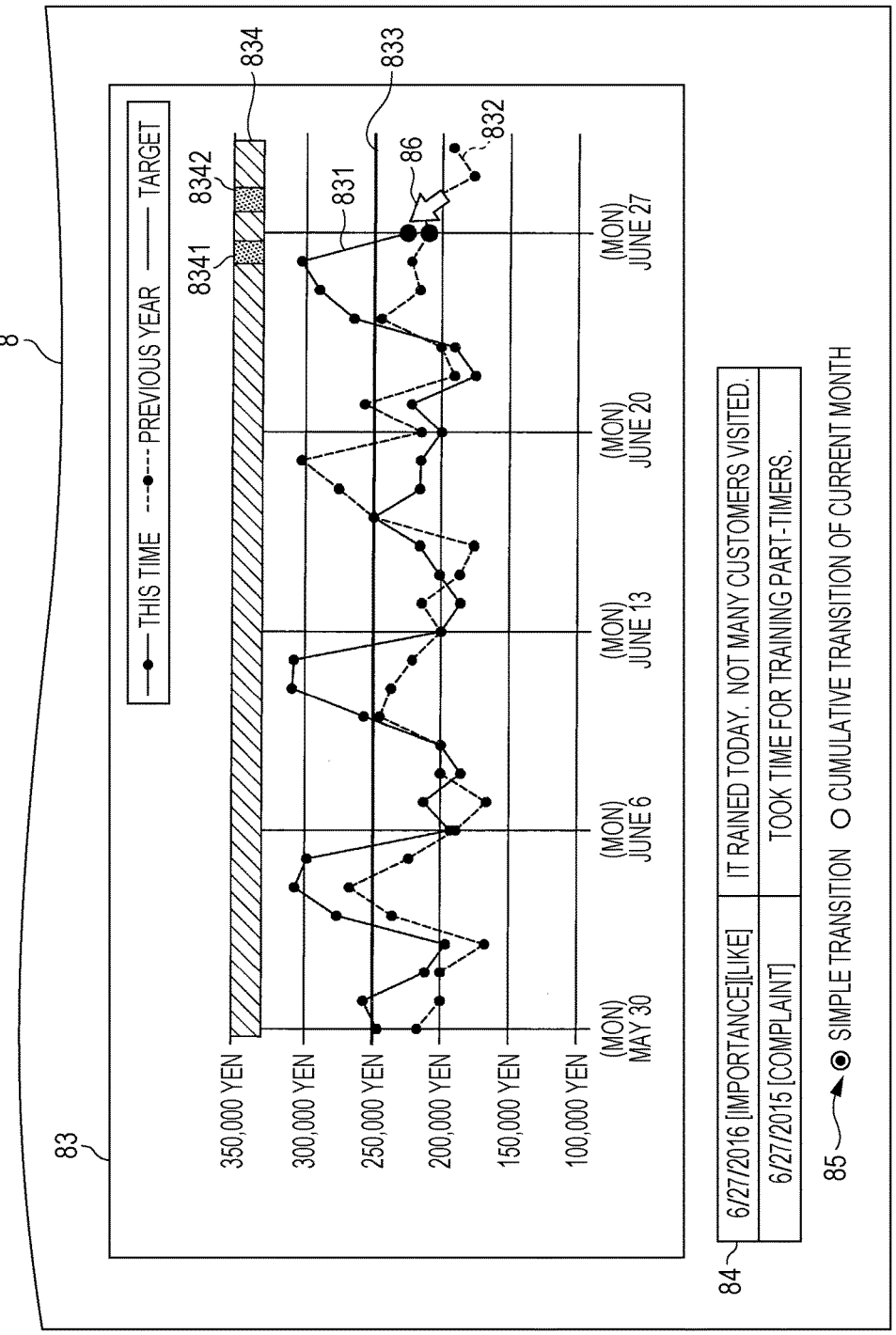
FIG. 12 is a diagram showing an example of an indicator analysis graph on the indicator analysis screen.

FIG. 12 is a diagram showing an example of the indicator analysis graph 83 on the indicator analysis screen 8.

In the indicator analysis graph 83, the vertical axis represents the values of "sales", and the horizontal axis represents dates. On top of a plot for this time 831, a plot for the previous year 832 and a target plot 833 are displayed. The plot for this time 831 indicates time-series transitions for this time. The plot for the previous year 832 indicates time-series transitions over the corresponding dates of the previous year. The target plot 833 indicates the target value of each date. In this indicator analysis graph 83, the plot for this time 831 is indicated by the solid line, the plot for the previous year 832 is indicated by the broken line, and the target plot 833 is indicated by the bold solid line.

In addition, a mouse cursor 86 is displayed on the graph 83. The mouse cursor 86 points to Monday, June 27. Furthermore, a marker of the plot for this time 831 and a marker of the plot for the previous year 832 are highlighted on June 27. The CPU 21 displays the mouse cursor 86 so that the mouse cursor 86 moves on the plot for this time 831 along the plot for this time 831 in response to the user operation.

The CPU 21 operates as a graph display control unit that displays the indicator analysis graph 83. In the indicator analysis graph 83, the plot for this time 831 (first transition graph) representing a focus period of time-series information and the plot for the previous year 832 (second transition graph) representing a contrast period which corresponds to one period before the focus period of the time-series information are arranged such that the dates of the focus period and the dates of the contrast period which is one year before the dates of the focus period are placed in identical positions.

In the example shown in FIG. 12, the plot for the previous year 832 and the target plot 833 are displayed on top of the plot for this time 831 which is the most recent weekly management data. When the user selects the monthly switching radio button 811 or the daily switching radio button 813, the indicator analysis graph 83 showing corresponding monthly or daily management data is re-displayed. Subsequently, when the user selects the weekly switching radio button 812, the indicator analysis graph 83 showing the weekly management data is re-displayed.

Furthermore, the period displayed in the graph can also be changed in response to the operation of a slide bar 834. The entire slide bar 834 indicates the past 52 weeks and the future 4 weeks. A slider 8341 of the slide bar 834 indicates the beginning of the graph display period. A slider 8342 of the slide bar 834 indicates the end of the graph display period.

By operating these sliders 8341 and 8342, any period between the past 52 weeks and the future 4 weeks can be displayed. In the past 52 weeks, the plot for this time 831, the plot for the previous year 832, and the target plot 833 are displayed. In the future 4 weeks, the plot for the previous year 832 and the target plot 833 are displayed. The plot for the previous year 832 in the future 4 weeks actually refers to the management data from the past 48th week to 52nd week.

That is, in this indicator analysis graph 83, the plot for the previous year 832 is displayed on top of the plot for this time 831 such that time-axis components of the dates of this year and the dates of the previous year are placed in identical positions. The plot for this time 831 shows transitions of the time-series information, i.e., the management data in the current period. The plot for the previous year 832 shows transitions in the previous period which is the previous year. Furthermore, this indicator analysis graph 83 is displayed on the screen, including a portion corresponding to the future four weeks in this current period.

In other words, this indicator analysis graph 83 displays the plot for the previous year 832 which is a contrast period including a portion corresponding to the future four weeks in the focus period and indicating time-series transitions, on top of the plot for this time 831 indicating time-series transitions of the time-series information, i.e., the management data, in the focus period. Here, the contrast period corresponds to one period before the focus period. The CPU 21 operates as the graph display control unit that displays this indicator analysis graph 83.

A comment field 84 displays comments relating to the date pointed by the mouse cursor 86 when the mouse cursor 86 is moved over the plot for this time 831 on the indicator analysis graph 83. The CPU 21 operates as a cursor display control unit that displays the mouse cursor 86 so that the mouse cursor 86 moves on the plot for this time 831 along the plot for this time 831 in response to the user operation.

Furthermore, the markers of the plot for this time 831 and the plot for the previous year 832 displayed on the date pointed by the mouse cursor 86 are increased in size. With this configuration, the dates displayed in the comment field 84 are recognizable.

The comment for this time is displayed on the first line, and the comment for the corresponding date of the previous year is displayed on the second line. In the case of a yearly event, therefore, it is possible to compare a comment relating to a periodic event, for example, Christmas or a national holiday, with a comment one period before. The CPU 21 operates as a comment display control unit that displays this comment field 84.

Transition selection radio buttons 85 are for selecting either simple transition or cumulative transition of the current month as an aggregation method for the graph. The simple transition is set by default. The transition selection radio buttons 85 are displayed only when the values of the "sales", the "number of customers", the "costs", the "labor costs", or the "gross profit" are displayed in the indicator analysis graph 83 This is because a cumulative value has no significance for items other than above.

Figure 13:
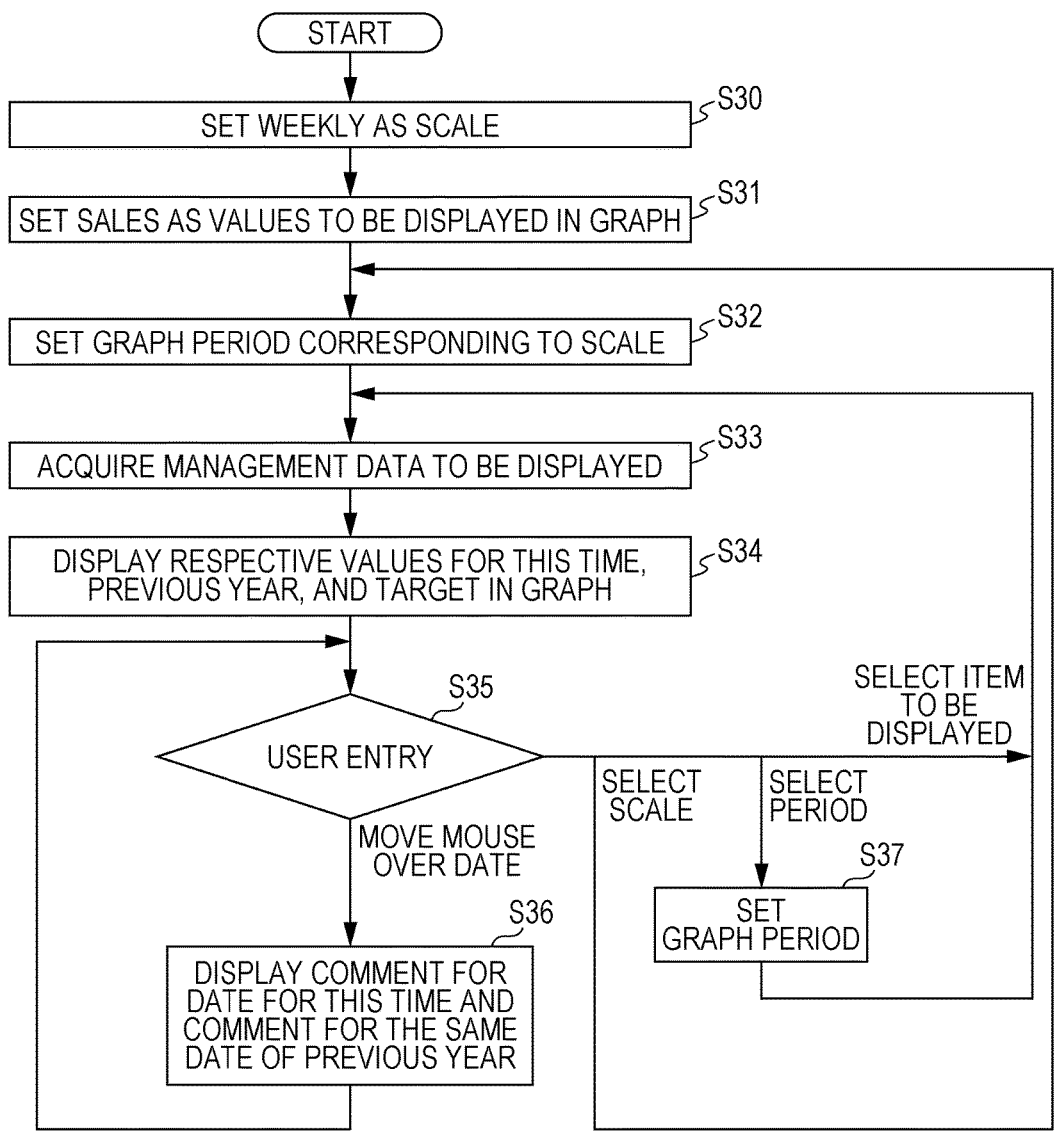
FIG. 13 is a flowchart showing an example of indicator analysis display processing performed by the server.

FIG. 13 is a flowchart showing an example of the indicator analysis display processing performed by the server device 2.

As shown in FIG. 13, when the communication unit 26 receives an access request to the indicator analysis screen 8 from the user terminal 3, the CPU 21 of the server device 2 starts the indicator analysis display processing with the weekly as a scale (step S30). The CPU 21 sets the item "sales" as the values to be displayed in the indicator analysis graph 83 (step S31) and sets a graph period corresponding to the selected scale (step S32).

The CPU 21 acquires the management data to be displayed on the indicator analysis screen 8 from the storage unit 25. The CPU 21 generates information to be displayed from the management data (step S33) and displays the plot for this time 831, the plot for the previous year 832 for the corresponding dates of the previous year, and the target plot 833 on top of one another in the indicator analysis graph 83 (step S34).

Subsequently, the CPU 21 of the server device 2 waits for an operation input from the user terminal 3 (step S35). For example, when the user moves the mouse cursor 86 over one of the dates in the indicator analysis graph 83 via the user terminal 3, the CPU 21 displays the comment for the date for this time and the comment for the corresponding date of the previous year (step S36), and waits for an operation input from the user terminal 3 in step S35.

When any one of the monthly switching radio button 811, the weekly switching radio button 812, and the daily switching radio button 813 is selected by the user operation (step S35→scale selection), the CPU 21 returns to step S32. The CPU 21 sets a graph period corresponding to the scale (step S32), reacquires the management data to be displayed (step S33), and redisplays the indicator analysis graph 83 (step S34).

When the sliders 8341 and 8342 are operated by the user operation, a graph period is set (step S37) and the CPU 21 returns to the processing in step S33. The CPU 21 reacquires the management data to be displayed (step S33) and redisplays the indicator analysis graph 83 (step S34).

By operating the slider 8341 to the left, the user can see how similar the management data of the previous year and the management data for this time are. By operating the slider 8342 to the right, the user can see day-to-day management data for the later dates than the corresponding date among the management data of the previous year. In a case where the similarity between the management data of the previous year and the management data for this time is high, it is possible to predict management data for the future up to 4 weeks from the current date, on the basis of the management data for a period, for example, from 52 weeks before to 48 weeks before, which are later dates than the corresponding date among the management data of the previous year. Accordingly, the user can readily consider management improvement measures on the basis of this prediction. A concept of the indicator analysis graph 83 will be described in detail with reference to FIG. 14 to be described later.

When a new item is selected for display by the user operation, the CPU 21 returns to the processing in step S33. The CPU 21 reacquires the management data to be displayed (step S33) and redisplays the indicator analysis graph 83 (step S34). This configuration allows the user to check not only the "sales" shown in the example but also a graph of other management data, enabling further consideration of management.

Figure 14:
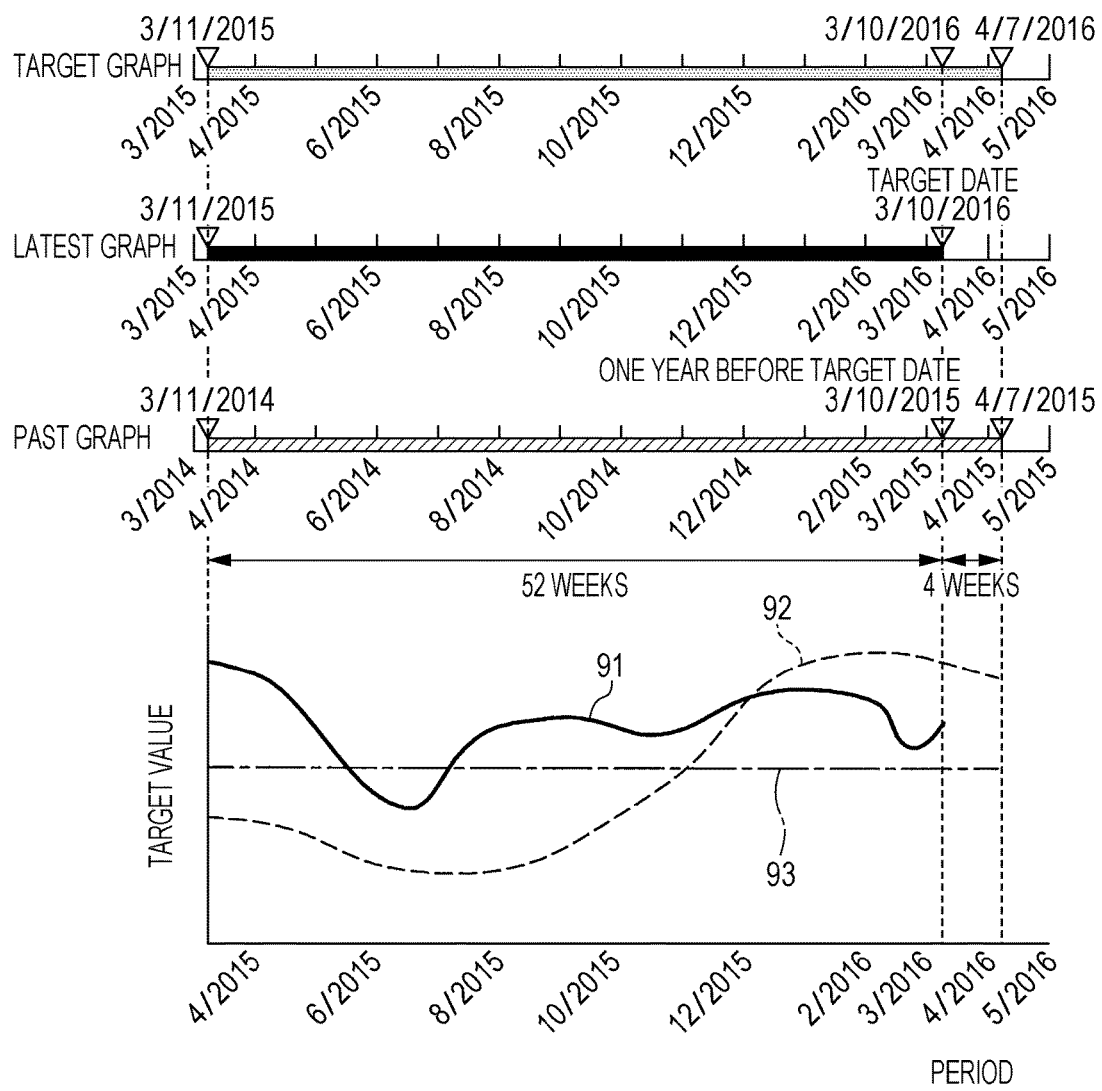
FIG. 14 is a diagram showing a concept of the indicator analysis graph.

FIG. 14 is a diagram showing the concept of the indicator analysis graph 83.

A target graph corresponds to the target plot 833 (see FIG. 13). A latest graph corresponds to the plot for this time 831 (see FIG. 13). A past graph corresponds to the plot for the previous year 832.

It is assumed that it is the target date at present and this target date is Mar. 10, 2016. Meanwhile, the target graph and the past graph have management data for four weeks from March 10 to April 7. Note that what is actually stored in the past graph is the information corresponding to one year before this period, i.e., from Mar. 10, 2015 to Apr. 7, 2015.

The latest graph has management data from Mar. 11, 2015 to Mar. 10, 2016. Similarly, the target graph and the past graph have management data from March 11 to March 10. Note that what is stored in the past graph is the management data from Mar. 11, 2014 to Mar. 10, 2015.

The graphs plotting this data are shown below the past graph.

A latest plot 91 is displayed over the past 52 weeks. In contrast, a past plot 92 and a target plot 93 are displayed over the future 4 weeks in addition to the past 52 weeks. By comparing with the management data for one period before and checking how the management data for one period before has changed, the future change of the management data can be predicted.

In FIGS. 11 to 14, the target date corresponding to the previous year as the previous period is the same date one year before. However, it may be the date of the same day of the week 52 weeks before. With reference to FIGS. 15 to 18, description will be given of the indicator analysis display processing in which the target date corresponding to the previous year as the previous period is 52 weeks before (note that repetitive description will be omitted).

FIG. 15 is a view showing another example of the management data table 82 on the indicator analysis screen 8.

The target period corresponding to the previous year is 52 weeks before. Therefore, it is possible to reference the pieces of aggregate data with the days of the week aligned to each other in the target period.

FIG. 16 is a diagram showing another example of the indicator analysis graph 83 on the indicator analysis screen 8.

In the comment field 84, the date displayed in the previous period is the date of the same day of the week 52 weeks before. Therefore, it is possible to reference comments for the dates displayed, in which the day of the week is the same.

Figure 17:
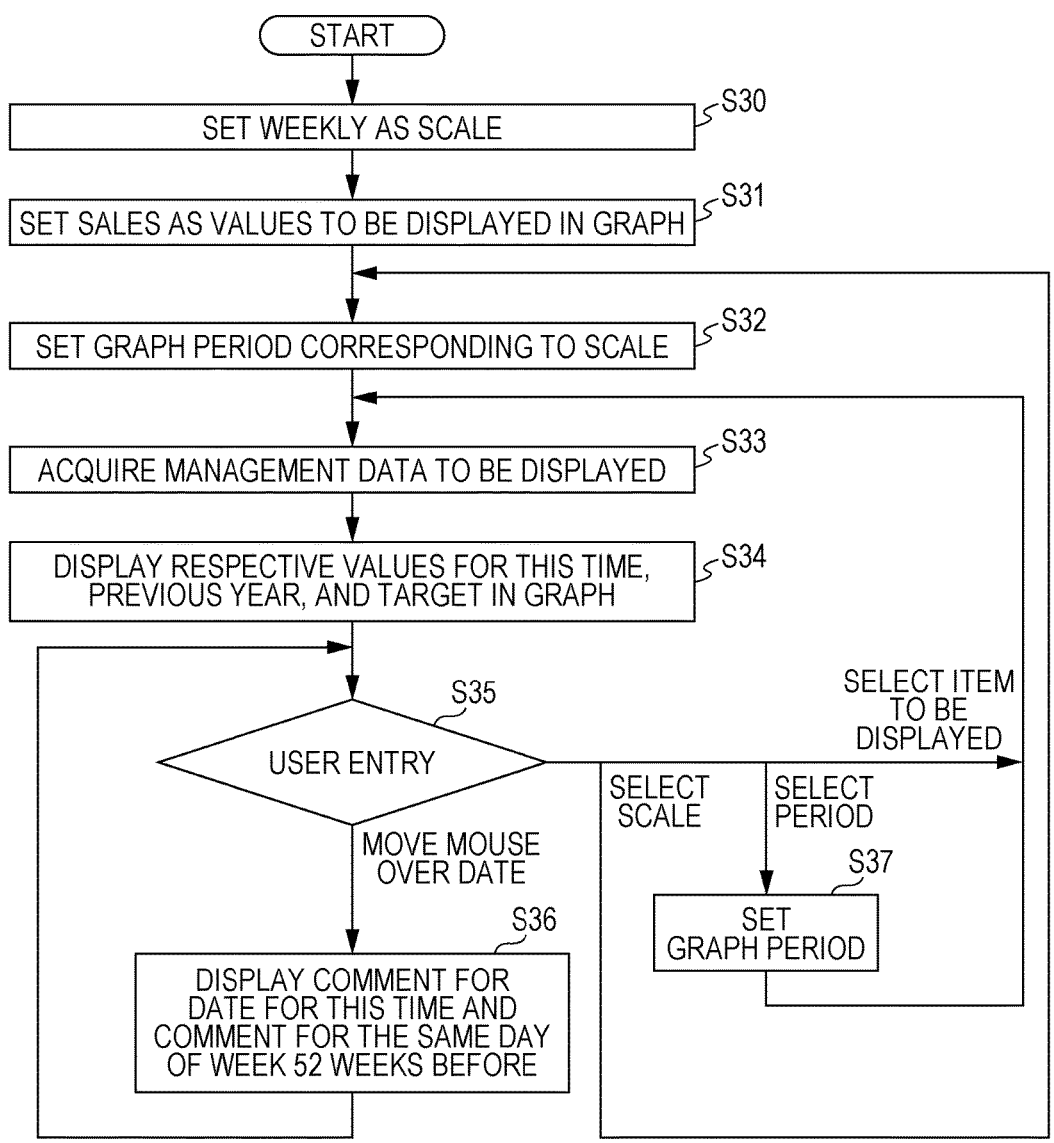
FIG. 17 is a flowchart showing another example of the indicator analysis display processing performed by the server.

FIG. 17 is a flowchart showing another example of the indicator analysis display processing performed by the server device 2.

In step S36, a comment for the date for this time and a comment for the date of the same day of the week 52 weeks before are displayed.

Figure 18:
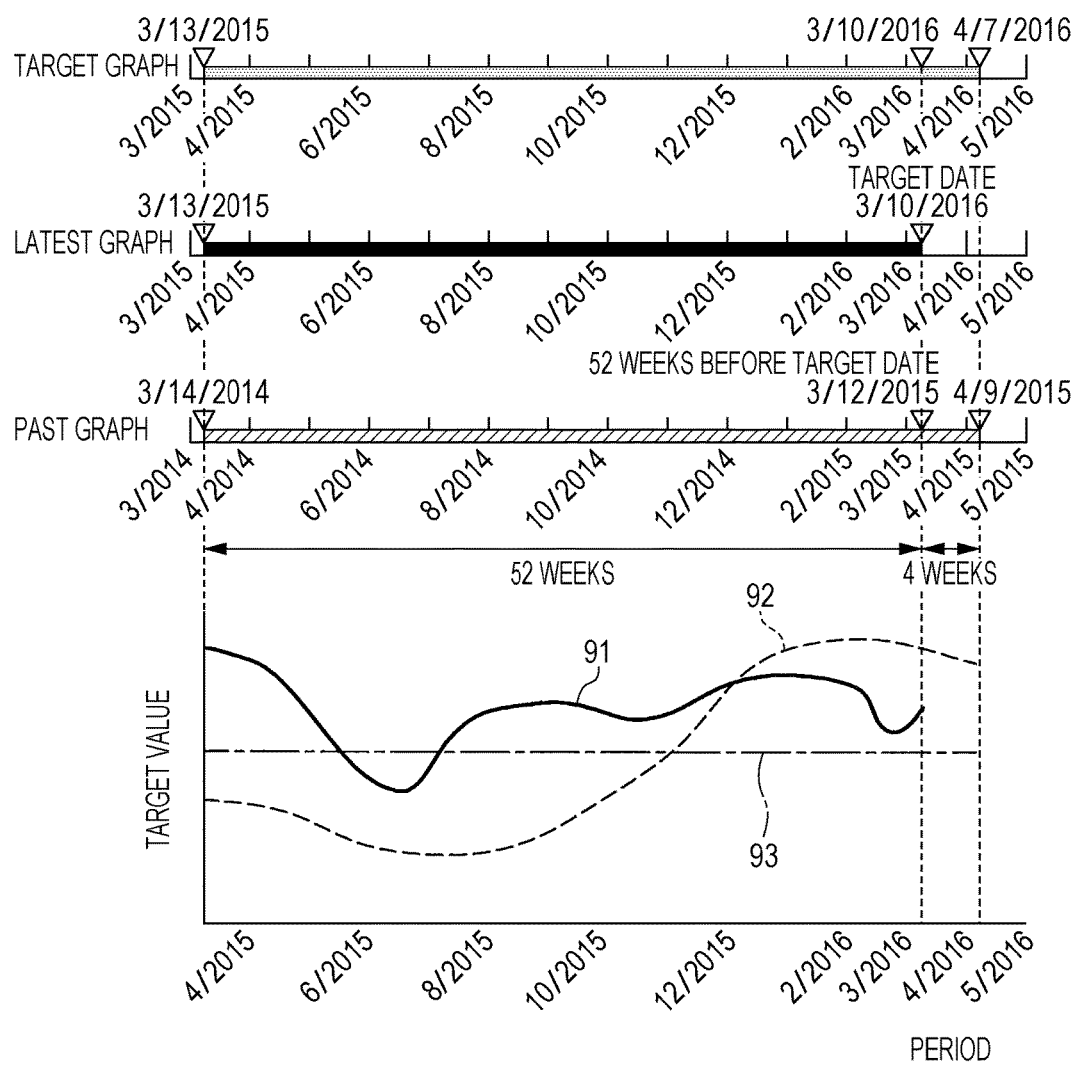
FIG. 18 is a diagram showing another concept of the indicator analysis graph.

FIG. 18 is a diagram showing another concept of the indicator analysis graph 83.

It is assumed that it is the target date at present, and this target date is Thursday, Mar. 10, 2016. Meanwhile, the target graph and the past graph have management data for a period of four weeks from Thursday, Mar. 10, 2016 to Thursday, Apr. 7, 2016. Note that what is actually stored in the past graph is the information corresponding to 52 weeks before this period (about one year before), i.e., from Thursday, Mar. 12, 2015 to Thursday, Apr. 9, 2015.

The latest graph has management data for a period of 52 weeks from Friday, Mar. 13, 2015 to Thursday, Mar. 10, 2016. Similarly, the target graph and the past graph have management data for the period of 52 weeks from Friday, Mar. 13, 2015 to Thursday, Mar. 10, 2016. Note that what is stored in the past graph is the management data from Friday, Mar. 14, 2014 to Thursday, Mar. 12, 2015.

The graphs plotting this data are shown below the past graph.

Since a latest plot 91 is displayed on top of a plot for the same days of the week 52 weeks before, there is no difference between the two pieces of the management data in terms of the days of the week. This makes it possible to collate and find the difference between the two pieces of management data from different years.

(Modifications)

The present invention is not limited to the embodiment described above, and can be modified and implemented without departing from the gist of the present invention. For example, the following modifications (a) to (h) can be made.

(a) In the embodiment described above, the server device 2 receives management data, comment information, and the like via the user terminal 3 and displays various display screens on the user terminal 3 accordingly. However, the present invention is not limited thereto. For example, the management data, the comment information, and the like may be directly entered from the operation input unit 22 of the server device 2, and various display screens may be displayed on the display unit 24 accordingly. Alternatively, the user terminal 3 and the like used by the user may be similarly configured to function as the management support device.

(b) In the embodiment described above, the importance level information indicates the importance level of a comment which is rated on a three-level scale according to the user's selection. However, the present invention is not limited thereto. For example, the comment may be rated on a two-level scale indicating whether the comment is important, or may be rated on a scale of four or greater levels. Furthermore, the server device 2 may be configured such that the importance level of the importance level information is customizable according to the user operation.

(c) In the embodiment described above, at least one of image data and POP data is included as additional information which is entered and displayed together with the comment information. However, the present invention is not limited thereto. For example, document data, graphic data, and moving image data may also be included.

(d) In the embodiment described above, the "rain" check box 584 is displayed in the "today's event" area 58. Alternatively, a weather entry menu for entering the weather may be displayed, for example. Alternatively, when the "rain" check box 584 for a specific date is checked, a color, a mark, or the like of the plot of the area corresponding to this date may be changed in the indicator analysis graph 83, for example. Such a configuration allows the user checking the indicator analysis graph 83 to check the weather together, facilitating the consideration of management.

(e) In the embodiment described above, the management data table 82 is displayed on the indicator analysis screen 8. However, the management data table 82 may not necessarily be displayed on the indicator analysis screen 8. Furthermore, although the "this time" field, the "target" field, the "previous time" field, the "previous year" field, and the "average of other stores" field are displayed in the management data table 82 in the embodiment, the present invention is not limited thereto. Instead of these fields or in addition to these fields, for example, fields such as "the time before last", "this month", "previous month", "today", and "yesterday" may be displayed, or only one of these fields may be displayed. Furthermore, although the management data of the "sales", the "number of customers", the "sales per customer", the "seat turnover", the "costs", the "labor costs", the "sales per man hour", the "FL rate", and the "gross profit" are displayed in the management data table 82 in the embodiment, the present invention is not limited thereto. For example, management data other than above may be displayed, or only one of these pieces of management data may be displayed.

(f) In the embodiment described above, when the indicator analysis graph 83 is selected by the user, the comment field 84 displays the comment information that has been entered. Alternatively, the comment information may be displayed in a balloon on the indicator analysis graph 83.

(g) In the embodiment described above, the past graph and the past plot 92 represent data one year before (or 52 weeks before). Without being limited thereto, the past plot 92 may represent data a plurality of years before (or an integral multiple of 52 weeks before), one quarter before, one month before, one week before, one day before, or any other period. Furthermore, although the past plot 92 and the target plot 93 have data for the future four weeks in the embodiment, the past plot 92 and the target plot 93 may have data of any period.

(h) Although the management support system has been described in the embodiment above, the present invention is not limited thereto and may be applied to a system that displays arbitrary time-series information.

The invention claimed is:

1. An information display system comprising a processor configured to execute the following processing operations:
   a graph display control processing operation of displaying a comparison graph in which a current transition graph representing a current period of time-series information and a previous transition graph representing a previous period of the time-series information are arranged such that time-axis components of the current period and time-axis components of the previous period which corresponds to one period before the time-axis components of the current period are placed in identical positions,
   wherein the graph display control processing operation displays a beginning part of the current transition graph at a portion corresponding to a future in the current period to be continuous from the previous transition graph;
   a cursor display control processing operation of displaying a cursor such that the cursor moves on the current transition graph along the current transition graph in response to a user operation; and
   a comment display control processing operation of displaying, on an identical screen, current comment information stored in association with each of the time-axis components of the current transition graph and previous comment information stored in association with each of the time-axis components of the previous transition graph,
   wherein the comment display control processing operation displays the current comment information and the previous comment information which are associated with the respective time-axis components corresponding to a position at which the cursor is displayed.

2. The information display system according to claim 1, comprising:
   a storage unit configured to store the time-series information and the comment information associated with each of the time-axis components of the time-series information,
   wherein the processor is configured to further execute: a display control operation configured to display, on the screen, the time-series information and a comment entry field for entering the comment information, and cause the storage unit to store the comment information entered in the comment entry field.

3. The information display system according to claim 2, wherein the storage unit stores attribute information indicating an attribute of the comment information, and
   the display control processing operation displays the attribute information in addition to the current comment information and displays the attribute information in addition to the previous comment information.

4. The information display system according to claim 1, wherein the graph display control processing operation processes one period of the time-series information as 52 weeks.

5. The information display system according to claim 1, wherein the comment display control processing operation displays, as the previous comment information, a comment for a date of an identical day of a week 52 weeks before.

6. The information display system according to claim 4, wherein the graph display control processing operation processes the portion corresponding to a future in the current period as 4 weeks.

7. An information display system comprising a processor configured to execute the following processing operations:
   a graph display control processing operation of displaying a comparison graph in which a first transition graph representing a focus period of time-series information and a second transition graph representing a contrast period which is one period before the focus period of the time-series information are arranged such that time-axis components of the focus period and time-axis components of the contrast period which corresponds to one period before the time-axis components of the focus period are placed in identical positions,
   wherein the graph display control processing operation displays a beginning part of the first transition graph at a portion corresponding to a future in the focus period to be continuous from the second transition graph
   a cursor display control processing operation of displaying a cursor such that the cursor moves on the first transition graph along the first transition graph in response to a user operation; and a comment display control processing operation of displaying, on an identical screen, first comment information stored in association with each of the time-axis components of the first transition graph and second comment information stored in association with each of the time-axis components of the second transition graph, wherein the comment display control processing operation unit displays the first comment information and the second comment information which are associated with the respective time-axis components corresponding to a position at which the cursor is displayed.

8. The information display system according to claim 7, comprising:

a storage unit configured to store the time-series information and the comment information associated with each of the time-axis components of the time-series information, wherein the processor is configured to further execute: a display control processing operation of displaying, on the screen, the time-series information and a comment entry field for entering the comment information, and cause the storage unit to store the comment information entered in the comment entry field.

9. The information display system according to claim 8, wherein the storage unit stores attribute information indicating an attribute of the comment information, and the display control processing operation displays the attribute information in addition to the first comment information and displays the attribute information in addition to the second comment information.

10. The information display system according to claim 7, wherein the graph display control processing operation processes one period of the time-series information as 52 weeks.

11. The information display system according to claim 10, wherein the graph display control processing operation processes the portion corresponding to a future in the current period as 4 weeks.

12. The information display system according to claim 7, wherein the comment display control processing operation displays, as the second comment information, a comment for a date of an identical day of a week 52 weeks before.

13. A non-transitory computer-readable recording medium storing a program for causing a computer of an information display system to execute the following processing operations, the processing operations comprising:

a graph display control processing operation of displaying a comparison graph in which a current transition graph representing a current period of time-series information and a previous transition graph representing a previous period of the time-series information are arranged such that time-axis components of the current period and time-axis components of the previous period which corresponds to one period before the time-axis components of the current period are placed in identical positions, wherein the graph display control processing operation displays a beginning part of the current transition graph at a portion corresponding to a future in the current period to be continuous from the previous transition graph a cursor display control processing operation of displaying a cursor such that the cursor moves on the current transition graph along the current transition graph in response to a user operation; and a comment display control processing operation of displaying, on an identical screen, current comment information stored in association with each of the time-axis components of the current transition graph and previous comment information stored in association with each of the time-axis components of the previous transition graph, wherein the comment display control processing displays the current comment information and the previous comment information which are associated with the respective time-axis components corresponding to a position at which the cursor is displayed.

14. The non-transitory computer-readable recording medium according to claim 13, the processing operations further comprising:

a storage processing operation of causing a memory to store the time-series information and the comment information associated with each of the time-axis components of the time-series information; and a display control processing operation of displaying, on the screen, the time-series information and a comment entry field for entering the comment information, and causing the memory to store the comment information entered in the comment entry field by the storage processing.

15. The non-transitory computer-readable recording medium according to claim 14, wherein the storage processing operation causes the memory to store attribute information indicating an attribute of the comment information, and the display control processing operation displays the attribute information in addition to the current comment information and displays the attribute information in addition to the previous comment information.

16. The non-transitory computer-readable recording medium according to claim 13, wherein the graph display control processing operation processes one period of the time-series information as 52 weeks.

17. The non-transitory computer-readable recording medium according to claim 13, wherein the comment display control processing operation displays, as the previous comment information, a comment for a date of an identical day of a week 52 weeks before.

* * * * *